US00RE37940E

(19) United States
(12) Reissued Patent
Imao et al.

(10) Patent Number: US RE37,940 E
(45) Date of Reissued Patent: Dec. 24, 2002

(54) INTERPOLATION METHOD AND COLOR CORRECTION METHOD USING INTERPOLATION

(76) Inventors: Kaoru Imao, No. 957-9-104, Shinoharacho, Kouhoku-ku, Yokohama-Shi, Kanagawa-ken (JP); Satoshi Ohuchi, No. 2-13-2-203, Bessho, Hachioji-Shi, Tokyo (JP)

(21) Appl. No.: 08/644,827

(22) Filed: May 10, 1996

Related U.S. Patent Documents

Reissue of:
(64) Patent No.: 5,311,332
Issued: May 10, 1994
Appl. No.: 07/810,119
Filed: Dec. 19, 1991

(30) Foreign Application Priority Data

| | | |
|---|---|---|
| Dec. 20, 1990 | (JP) | 2-418963 |
| Mar. 29, 1991 | (JP) | 3-093378 |
| Mar. 29, 1991 | (JP) | 3-093379 |
| Apr. 2, 1991 | (JP) | 3-096221 |
| Oct. 21, 1991 | (JP) | 3-301052 |

(51) Int. Cl.[7] ..... H04N 1/60
(52) U.S. Cl. ..... 358/1.9; 358/518; 358/523; 358/525
(58) Field of Search ..... 382/167; 358/518, 358/525, 520, 523, 524, 519, 1.9

(56) References Cited

U.S. PATENT DOCUMENTS 4,275,413 A * 6/1981 Sakamoto et al. ..... 358/525
4,959,711 A * 9/1990 Hung et al. ..... 358/523
4,992,861 A * 2/1991 D'Errico ..... 358/525
5,436,739 A 7/1995 Imao et al.

FOREIGN PATENT DOCUMENTS

| | | | |
|---|---|---|---|
| JP | 58-16180 | * | 3/1983 |
| JP | 2-206973 | * | 8/1990 |
| JP | 5-46750 | | 2/1993 |

OTHER PUBLICATIONS

Institute of Picture Electronics Engineers of Japan, vol. 10, No. 5, 1989, pp. 319–328, K. Kanamori et al., "Color Correction of Color Hardcopy By Interpolation Using 4 Neighborhood Points".*

* cited by examiner

*Primary Examiner*—Scott Rogers

(57) ABSTRACT

An interpolation method for color correction generates correction signals Y, M and C from input signals R, G and B through interpolation. In this interpolation method, a triangular prism is selected from plural unit triangular prisms in RGB space, based on x, y and z coordinates of the input signals, a gradient factor and an intercept factor of the selected prism are read out from a memory, and correction data corresponding to the input signals is calculated through interpolation using the gradient and intercept factors from the memory, so that the correction signals are generated based on the calculated correction data.

34 Claims, 18 Drawing Sheets

TYPE 1

TYPE 2 k1; LATTICE POINTS ON DIAGONAL LINE k2,k3; LATTICE POINTS ADJACENT TO DIAGONAL LINE h1~h4 : LATTICE POINTS IN HIGHLIGHTED AREA

INTERPOLATION METHOD AND COLOR CORRECTION METHOD USING INTERPOLATION

Matter enclosed in heavy brackets [ ] appears in the original patent but forms no part of this reissue specification; matter printed in italics indicates the additions made by reissue.

BACKGROUND OF THE INVENTION

The present invention generally relates to an interpolation method and a color correction method using interpolation, and more particularly to an interpolation method and a color correction method using interpolation in which yellow, magenta and cyan signals are generated from red, green and blue input signals. The methods are applicable to color copiers and color facsimile machines.

A linear masking techniques is known as a conventional color correction method. In this linear masking method, yellow, magenta and cyan ink quantity signals Y, M and C are obtained from red, green and blue input concentration signals R, G and B, and a relationship between the ink quantity signals and the input signals is represented by the following formula.

$$Y=\alpha 10+\text{all } R+\alpha 12\ G+\alpha 13\ B$$

$$M=\alpha 20+\alpha 21\ R+\alpha 22\ G+\alpha 23\ B$$

$$C=\alpha 30+\alpha 31\ R+\alpha 32\ G+\alpha 33\ B \tag{1}$$

In the formula (1), a10 through a33 are correction coefficients whose values can be determined through a beast square method on measurement data obtained by scanning several color pattern data.

Although this linear masking technique is useful and application of the linear masking allows small-size color correction hardware to be designed, it is difficult to achieve accurate color correction when the linear masking technique is applied, because the ink quantity signals are very roughly defined in formula (1). In order to achieve accurate color correction, it is necessary to use a non-linear masking technique in which 2nd-order terms such as $R^2$, R G, or G B are additionally incorporated in formula (1). In another case, higher-order terms are further incorporated for achieving very accurate color correction, and reproducing color images closely resembling the originals. When the non-linear masking technique is used, a relationship between the ink quantity signals Y, M and C and the input signals R, G and B is represented as follows.

$$\begin{aligned} Y &= a10 + a11\ R + a12\ G + a13\ B + a14\ R*2 + \\ &\quad a15\ G*2 + a16\ B*2 + a17\ R\ G + a18\ G\ B + a19\ B\ R \\ M &= a20 + a21\ R + a22\ G + a23\ B + a24\ R*2 + \\ &\quad a25\ G*2 + a26\ B*2 + a27\ R\ G + a28\ G\ B + a29\ B\ R \\ C &= a30 + a31\ R + a32\ G + a33\ B + a34\ R*2 + \\ &\quad a35\ G*2 + a36\ B*2 + a37\ R\ G + a38\ G\ B + a39\ B\ R \end{aligned} \tag{2}$$

In formula (2), a multiplication sign "x" is omitted, a10 through a39 are correction coefficients whose values are predetermined through a least square method based on measurement data obtained by scanning a number of color patterns, and "R * 2", for example, denotes the square of R.

Other conventional interpolation methods are applied to the color correction method in which color correction is carried out using interpolation so as to generate yellow, magenta and cyan ink quantity signals Y M and C from the input data of red, green and blue concentration signals R, G and B. In a first method of the conventional interpolation methods, RGB space is divided into plural unit cubes, color correction data is predetermined with respect to eight lattice points of each of the unit cubes, and color correction values corresponding to input RGB signals at intermediate points between two of the lattice points, are obtained through 8-point linear interpolation which is done using the predetermined correction data. When the linear interpolation is performed, it is required to calculate eight products and sums with the data. This first method has a problem in that it requires a long processing time for color correction and relatively complicated hardware. Also, in the case of the first method there is a problem in that on boundaries between adjacent unit cubes there exists a discontinuity in interpolation values calculated by the linear interpolation procedure.

A second interpolation method was proposed in order to eliminate the above described problems of the first method. For example, Japanese Patent Publication No. 58-16180 discloses such an interpolation method. In this second method, RGB space is divided into plural unit cubes and each of the unit cubes is further divided into plural small tetrahedrons. Color correction data is predetermined with respect to four vertex points of each of the tetrahedrons, and it is stored in a memory. A unit cube is selected from among the plural unit cubes based on the higher bits of data of input RGB signals (the higher bits denote, e.g., the most significant four bits of 8-bit data), and one tetrahedron is selected from the plural tetrahedrons included in the selected unit cube, based on the lower bits of data of the input RGB signals (the lower bits denote, hereinafter, e.g., the least significant four bits of 8-bit data). Color correction values corresponding to the input RGB signals are obtained, using the stored correction data, through linear interpolation with respect to the vertex points of the selected tetrahedron. Although the second method can be carried out by using a calculation formula which is simpler than that of the first method using 8-point interpolation, there is a problem in that hardware to which the second method is applied must have a relatively great size because of a relatively large number of multipliers required for calculating the color correction values.

Also, in order to eliminate the above described problems of the first method, a third interpolation technique was proposed. For example, Japanese Laid-Open Patent Application No. 2-206973 and "Color Correction of Color Hardcopy by Interpolation using 4-neighborhood Points" by K. Kanamori and H. Kotera, from a transaction of Institute of Picture Electronics Engineers of Japan (Gazou Denshi Gakkai-Shi), vol.10, no.5, 1989, p.319–328, disclose this third interpolation method. In this third method, RGB space is divided into plural unit cubes, each of the unit cubes is further divided into five small tetrahedrons, and color correction factors, which are predetermined with respect to four vertex points of each of the tetrahedrons, are stored in a memory. Based on the higher bits of data of input RGB signals, a unit cube is selected from the plural unit cubes, and one tetrahedron is selected from the plural tetrahedrons included in the selected unit cube based on the lower bits of data of the input RGB signals. Color correction values corresponding to the input RGB signals are obtained through multiplication/addition calculations done, using the stored color correction factors, with respect to the selected tetrahedron and the data of the input RGB signals. Although hardware for carrying out the third method uses only three multipliers and three adders, and the required hardware is of simple construction, there is a problem in that all the bits of data of input RGB signals are input to the multipliers, and the multipliers must have relatively great size.

In the above conventional interpolation methods, Y, M and C correction values, corresponding to lattice points on each tetrahedron, are determined by calculating, through a least square method, correction factors included in a non-linear function such as that represented by formula (2). The YMC correction values corresponding to the lattice points can be determined appropriately only if the number of small tetrahedrons into which RGB space is divided is great enough. Thus, only if such a condition is satisfied, the interpolation can be done within unit regions, so as to achieve very accurate color correction results. If the number of small tetrahedrons is not great enough, it is difficult to achieve accurate color correction through the above interpolation techniques. Also, in the cases of the above techniques, the YMC correction values corresponding to the lattice points of the tetrahedrons are determined regardless of whether or not the number of such tetrahedrons is large enough.

For determining the correction coefficients through the least square method, the above described methods use reference ink quantity signals measured by scanning color patterns which are printed with predetermined ink quantities, and concentration data obtained by decomposing the scanned data of the color patterns. The concentration data from the scanned color data is gathered densely in a diagonally extending central area of RGB space, which contains a diagonal line (R=G=B), and which concentration data does not exist uniformly in RGB space. The concentration data exists sparsely in peripheral areas of RGB space, which areas are located in RGB space at corners and peripheral portions distant from the diagonal line. FIG.1A shows such a distribution of the concentration data obtained from the printed color patterns in RGB space. In FIG.1A, concentration data 12 is gathered densely in a diagonally extending central area of RGB space adjacent to a diagonal like 11 (R=G=B) and little concentration data exists in peripheral areas of RGB space when the concentration data is obtained by scanning printed color patterns.

When approximate Y, M and C ink quantity signals are obtained by the non-linear function being applied to the whole of RGB space using the concentration data from the color patterns, there is a problem in that an excessively large amount of data is generated and in that divergence may occur with respect to lattice points, in the peripheral areas of RGB space, where the concentration data exists sparsely. Generally, a region in which concentration data generated from printed data exists is narrower than that in which concentration data generated from photographic data exists. FIG.1B shows a distribution of concentration data generated by scanning photographic data. In FIG.1B, the concentration data from the photographic data exists in a wider region of the RG plane, approaching the peripheral portions thereof, as indicated by a dotted line 13 in FIG.1B. In such a case, if Y, M and C ink quantities are preset with respect to lattice points in the peripheral areas as in the above conventional methods, there is a problem in that an irregularly corrected or unusual color may appear in the reproduced image. Such peripheral areas of RGB space are indicated by shading lines in FIG.2.

When the above conventional methods are used, color reproduction error and/or concentration difference can be reduced uniformly in the whole of RGB space. Such concentration difference, however, is not always lower than a prescribed level in local areas such as achromatic color areas or highlighted areas where a difference between original color and reproduced color is especially appreciable. Thus, there is a problem in that the conventional methods do not necessarily provide high-quality reproduced images.

SUMMARY OF THE INVENTION

Accordingly, it is a general object of the present invention to provide an improved interpolation and color correction method in which the above described problems of the conventional methods are eliminated.

Another and more specific object of the present invention is to provide an interpolation method which realizes a color correction hardware of simple structure, and carries out accurate color correction using a memory of small storage capacity.

Still another object of the present invention is to provide an interpolation method of the space-division type in which lattice point is appropriately predetermined corresponding to lattice points in RGB space.

A further object of the present invention is to provide a color correction method which improves the quality of a reproduced image corresponding to a peripheral area of RGB space.

A further object of the present invention is to provide a color correction method which improves the quality of a reproduced image corresponding to a local area of RGB space in which a color difference between the original image and the reproduced image is appreciable.

The above mentioned objects of the present invention can be achieved by an interpolation method for converting input color signals into correction signals, which comprises the steps of selecting a triangular prism based x, y and z coordinates of the input signals from plural unit triangular prisms into which XYZ space is divided, reading out lattice point data of the selected triangular prism from a memory in which predetermined correction data is stored, the correction data corresponding to lattice points of each of the plural unit triangular prisms, and calculating correction data corresponding to the input signals through interpolation of values of the lattice point data read out from the memory so that the correction signals are generated based on the calculated correction data. According to the present invention, it is possible to realize color correction hardware of simple construction and carry out accurate color correction using a memory of small storage capacity.

The above mentioned objects of the present invention can also be achieved by a color correction method for generating color correction signals Y, M and C from input signals R, G and B through interpolation, which comprises the steps of calculating a set of correction factors included in a linear function and a set of correction factors included in a non-linear function through a least square method based on plural color pattern data which is printed with predetermined ink quantities, and based on density data obtained by color decomposition of the plural color pattern data, determining correction signals Y, M and C, corresponding to lattice points in RGB space by using either the linear of the non-linear function including the calculated set of correction factors, setting the correction signals Y, M and C, determined by using the linear function, to a lattice point in RGB space when the lattice point is located in an area of RGB space in which the density data is lower than a predetermined level, and setting the correction signals Y, M and C, determined by using the non-linear function, to a lattice point in RGB space when the lattice point is not located in an area of RGB space in which the density data is lower than a predetermined level. According to the present invention, it is possible to attain high quality of reproduced image corresponding to a local area of RGB space in which a color difference between the original image and the reproduced image is appreciable.

Other objects and further features of the present invention will be apparent from the following detailed description when read in conjunction with the accompanying drawings.

DESCRIPTION OF THE PREFERRED EMBODIMENTS

Figure 4:
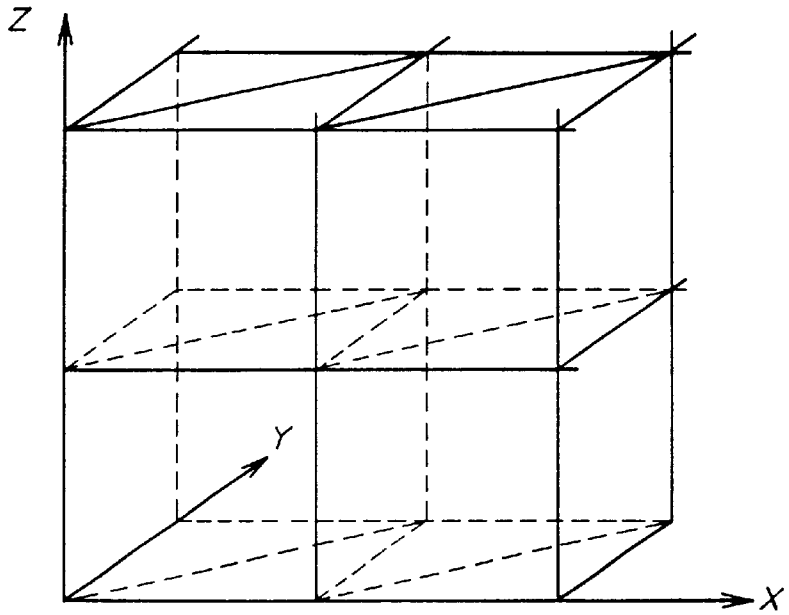
FIG.4 is a diagram for explaining a method of dividing XYZ space into unit triangular prisms.

A description will now be given of a method of dividing XYZ space into plural unit triangular prisms according to the present invention, with reference to FIGS.4 through 6. In FIG.4, XYZ space is divided into plural unit triangular prisms, and in FIG.5, each of the triangular prisms has six vertex points to which six predetermined output values correspond. When an output data P needs to be obtained from input data having x, y and z coordinates, a unit triangular prism containing the x, y and z coordinates of the input data is selected from the plural triangular prisms. The output data P is then determined through linear interpolation, based on predetermined output values corresponding to vertex points of the selected unit triangular prism. When the above interpolation is applied to color correction, RGB space in which a point can be defined by red, green and blue input signals corresponds to XYZ space mentioned above. In the case of a four-color image recording device, the output data P mentioned above corresponds to a set of yellow, magenta, cyan and black output signals.

Figure 5:
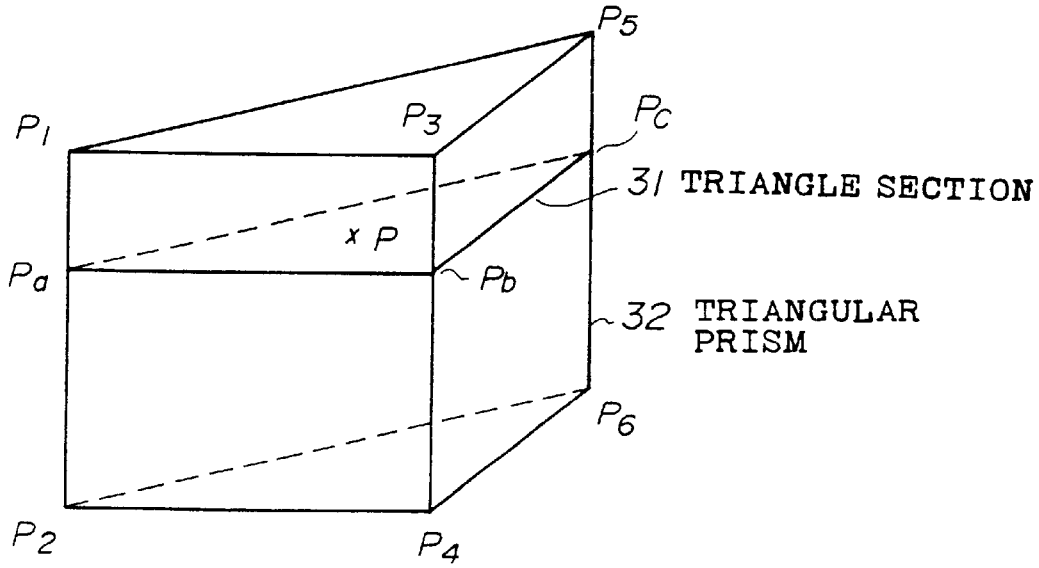
FIG.5 is a diagram for explaining interpolation which is done in a triangular prism.

FIG.5 shows a unit triangular prism for explaining linear interpolation according to the present invention, which is performed on ridges of the triangular prism. In FIG.5, output values Pi(i=1 to 6), with respect to six vertex points of a unit triangular prism 32 are predetermined. A triangle section 31 including x, y and z coordinates (unknown) of the output data P, and Pa, Pb and Pc being output values corresponding to points on ridges of the triangular prism 31 which are intersected by the triangle section 32. According to the present invention, the value of Pa is obtained through linear interpolation based on a ratio in length of a line segment P1-Pa to a line segment Pa-P2, as follows.

$$pa=(m1\ p2+m2\ P2)/(m1+m2) \tag{3}$$

In the above formula, ml is the length of the segment P1-Pa and m2 is the length of the segment Pa-P2. The values of Pb and Pc are obtained through linear interpolation based on a corresponding segment ratio in a similar manner.

Figure 6:
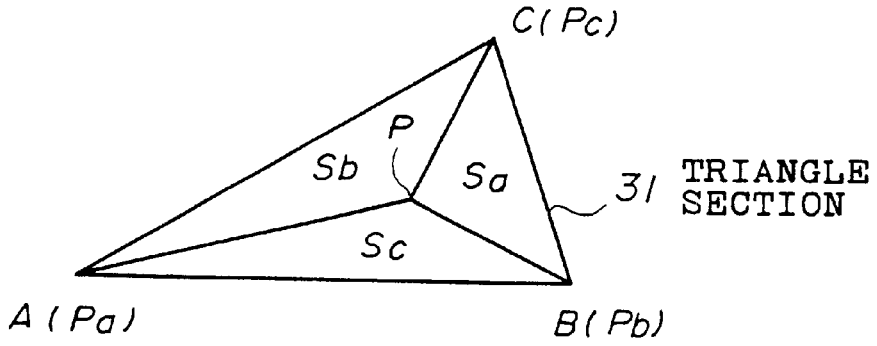
FIG.6 is a diagram for explaining interpolation which is done on a triangular section of a triangular prism.

FIG.6 is a diagram for explaining a method of determining the output data P through linear interpolation based on the known values Pa, Pb and Pc previously obtained. In FIG. 6, a triangle ABC, which is equivalent to the triangle section 31 in FIG.5, is divided into three small triangles PBC, PCA and PAB whose areas are equal to Sa, Sb and Sc respectively. The x, y and z coordinates of the output data P are determined through linear interpolation, based on the ratio of areas of the three triangles. According to the present invention, it is assumed that the area Sa of the triangle PBC denotes a weight of Pa in relation to the output data P, the area Sb of the triangle PCA denotes a weight of Pb in relation to the output data P, and the area of Sc of the triangle PAB denotes a weight of Pc in relation to the output data P. Thus, the output data P is represented by the following formula.

$$P=(SaPa+SbPb+ScPc)/(Sa+Sb+Sc) \tag{4}$$

Figure 7A:
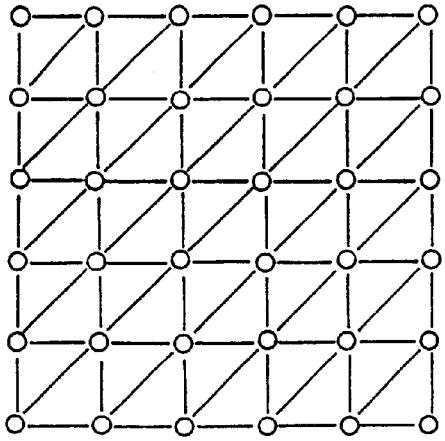
FIGS.7A and 7B are diagrams for explaining two types of space division methods to divide three-dimensional space into type-1 unit triangular prisms and divide the same into type-2 unit triangular prisms.
Figure 7B:
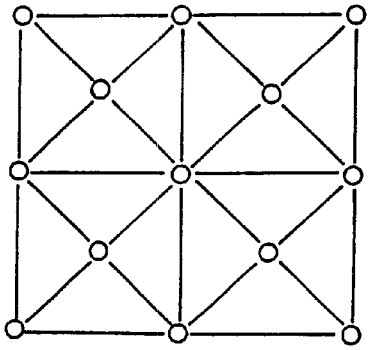

The above interpolation is done based on the ratio in area of the small triangles to the triangle ABC, and the calculation of the interpolation based on a ratio such as that of the triangle areas shown in FIG.6 is equivalent to the determination of the output data P based on a plane equation that is satisfied by x, y and z coordinates of the three points A, B and C. FIG.7A shows the above method for dividing three-dimensional space into plural unit triangular prisms, and such unit triangular prisms are called hereinafter type-1 triangular prisms. FIG.7B shows another method for dividing three-dimensional space into plural unit triangular prisms, and such unit triangular prisms obtained by the space-division method are called hereinafter type-2 triangular prisms.

Figure 1A:
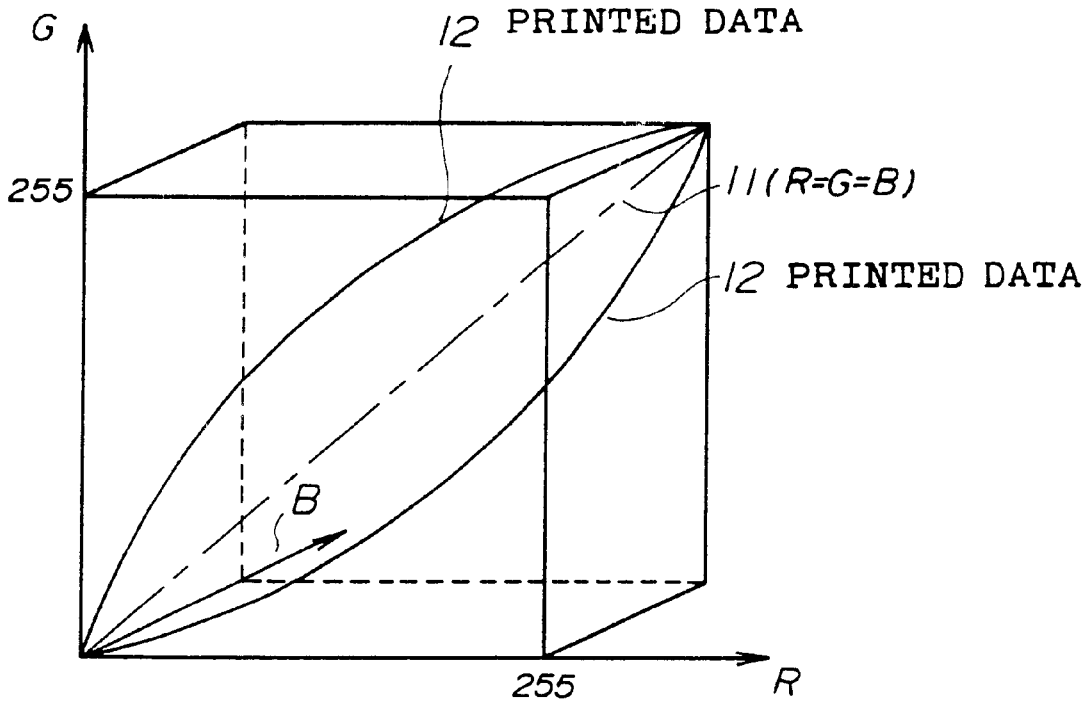
FIGS. 1A and 1B are diagrams for explaining a distribution of concentration data in RGB space, the concentration data being obtained from printed data and photographic data.
Figure 1B:
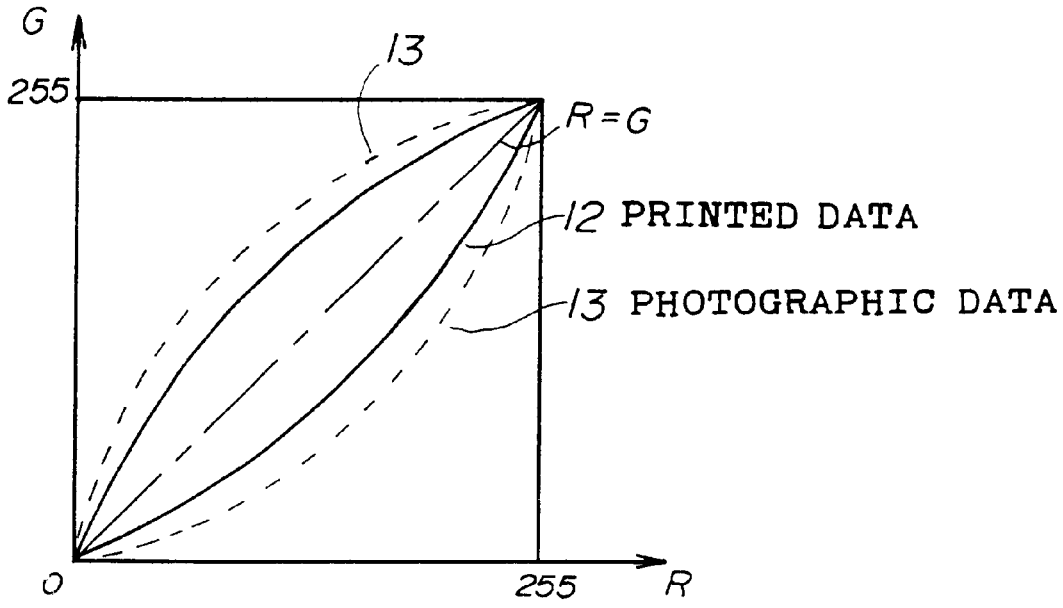
Figure 2:
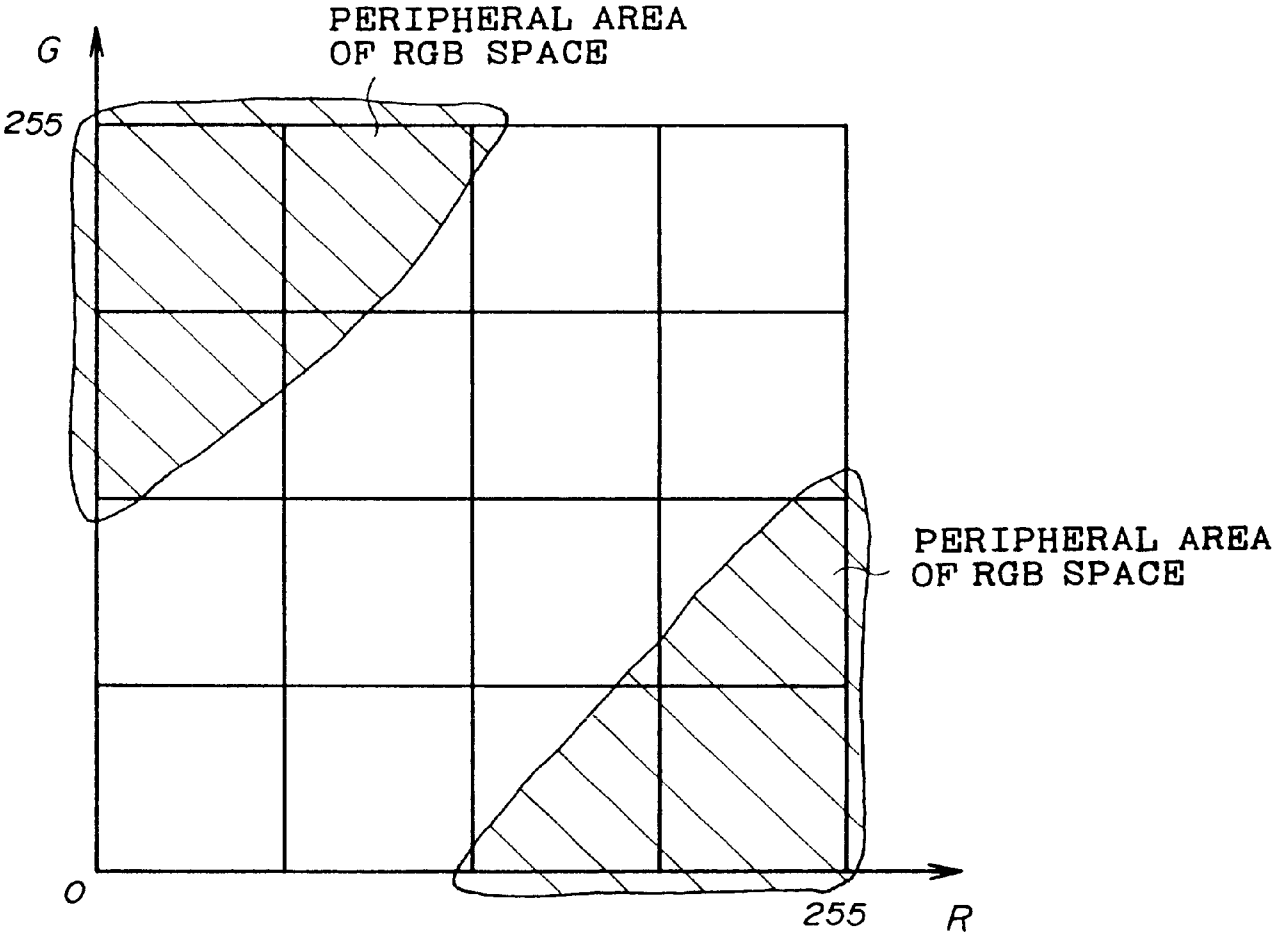
FIG.2 is a diagram showing peripheral areas of RGB space in which an irregularity is likely to appear in a reproduced image.
Figure 3:
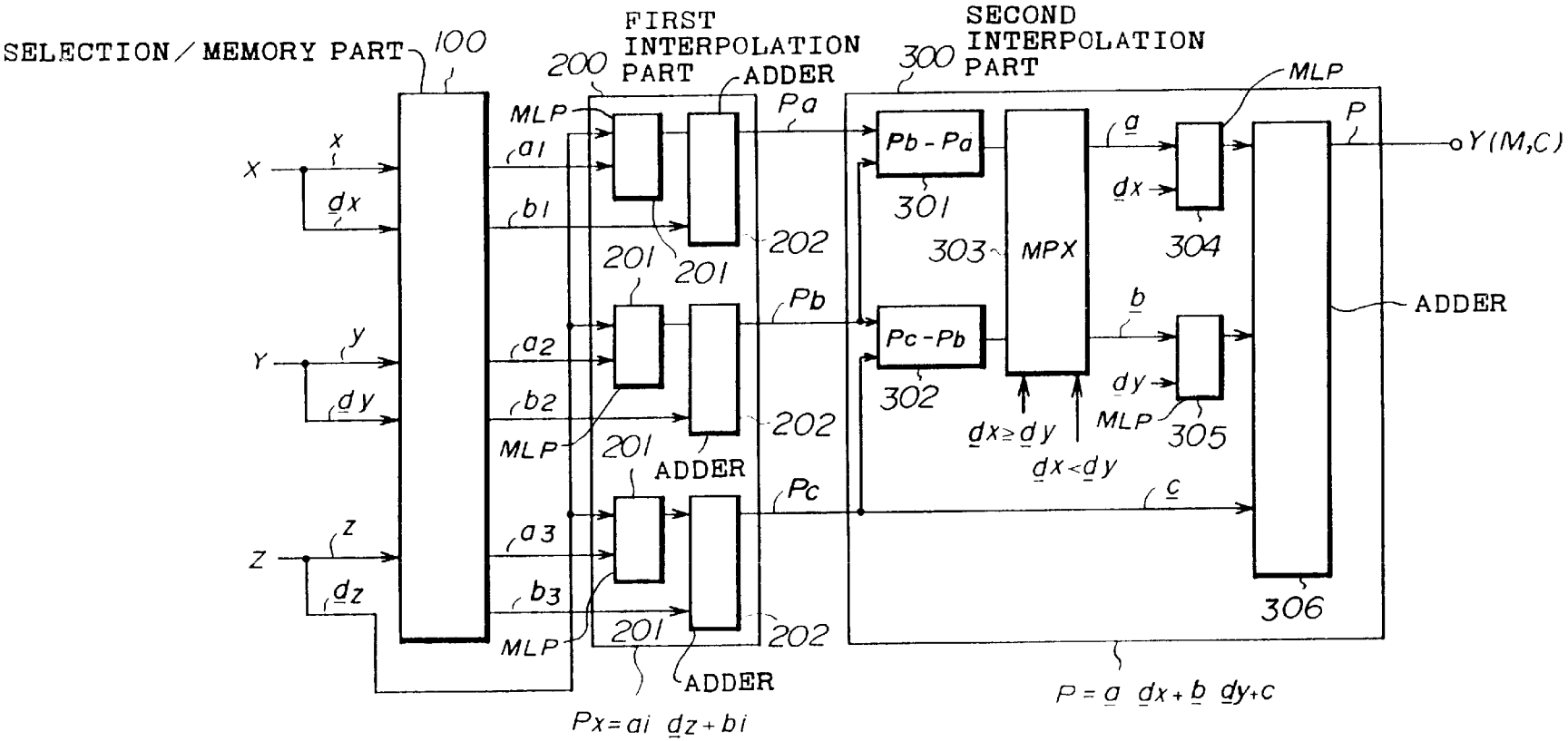
FIG.3 is a block diagram showing a construction of a color correction apparatus to which an embodiment of the present invention is applied.

Next, a description will be given of a construction of a color correction apparatus to which the present invention is applied, with reference to FIG.3. The color correction apparatus shown in FIG.3 obtains a yellow ink quantity signal Y from input density signals X, Y and Z (which are, for example, red, green and blue signals R, G and B), and outputs the yellow ink quantity signal Y. Similarly, it is possible to construct a color correction apparatus for outputting magenta and cyan ink quantity signals M and C. In FIG.3, a selection/memory part 100 selects a triangular prism based on the input density signals X, Y and Z, and reads out gradient factors "ai" (i=1 to 3) and intercept factors "bi" (i=1 to 3) with respect to three ridges in the selected prism from memories of the selection/memory part 100. A first interpolation part 200 includes three multipliers 201 and three adders 202, and performs interpolation calculations on the selected prism based on the gradient factors "ai" and the intercept factors "bi" from the selection/memory part 100.

A second interpolation part 300 includes two subtracters 301, 302, a multiplexer 303, two multipliers 304, 305 and an adder 306, and performs interpolation calculations of a triangle section of the selected prism which section is selected based on output data from the first interpolation part 200. Data "Pb-Pa" supplied by the subtracter 301 and data "Pc-Pb" supplied by the subtracter 302 are the input to the multiplexer 303, and the multiplexer 302 outputs signals indicative of correction factors a and b to the multipliers 304 and 305, respectively.

Selection of Triangular Prism

Generally, XYZ space is divided into plural unit cubes ($2^{3n}$ cubes), and x, y and z coordinates of XYZ space are divided into plural unit segments ($2^n$ unit segments ). Input signals X, Y and Z each having "f" bits are represented by $$X=x+\underline{d}x,\ Y=y+\underline{d}y,\ Z=z+\underline{d}z \tag{5}$$

In the above representation of the input signals X, Y and Z, it is assumed that x, y and z denote data at higher bits of the signals X, Y and Z, the number of higher bits indicated by "n", and $\underline{d}x$, $\underline{d}y$ and $\underline{d}z$ denote data at lower bits of the signals X, Y and Z, the number of lower bits indicated by "f–n". A unit cube is selected from the plural unit cubes based on the data (x, y, z) at higher bits of the signals X, Y and Z, and relative positions in the selected cube are obtained based on the data ($\underline{d}x$, $\underline{d}y$ and $\underline{d}z$) at lower bits of the signals X, Y and Z. For example, the higher bits of the signals denote the most signification four bits and the lower bits of the signals denote the least significant four bits.

Figure 8A:
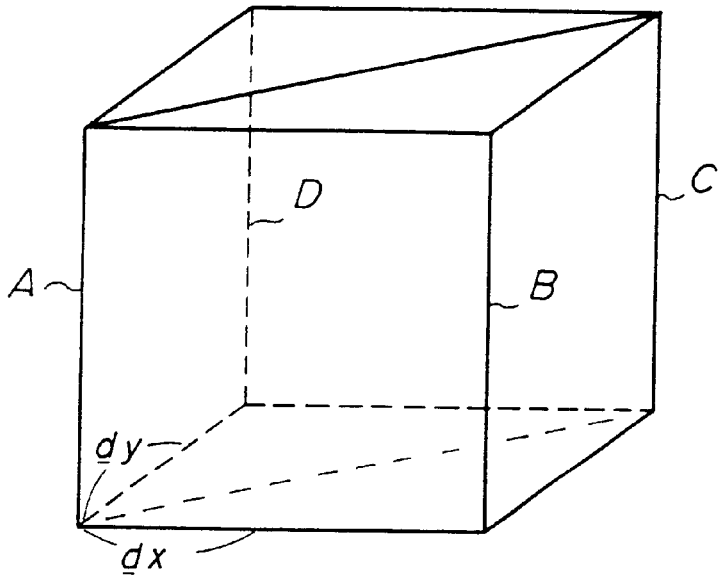
FIGS.8A and 8B are diagrams for explaining a selection process according to the invention for selecting a type-1 triangular prism based on input signals.
Figure 8B:
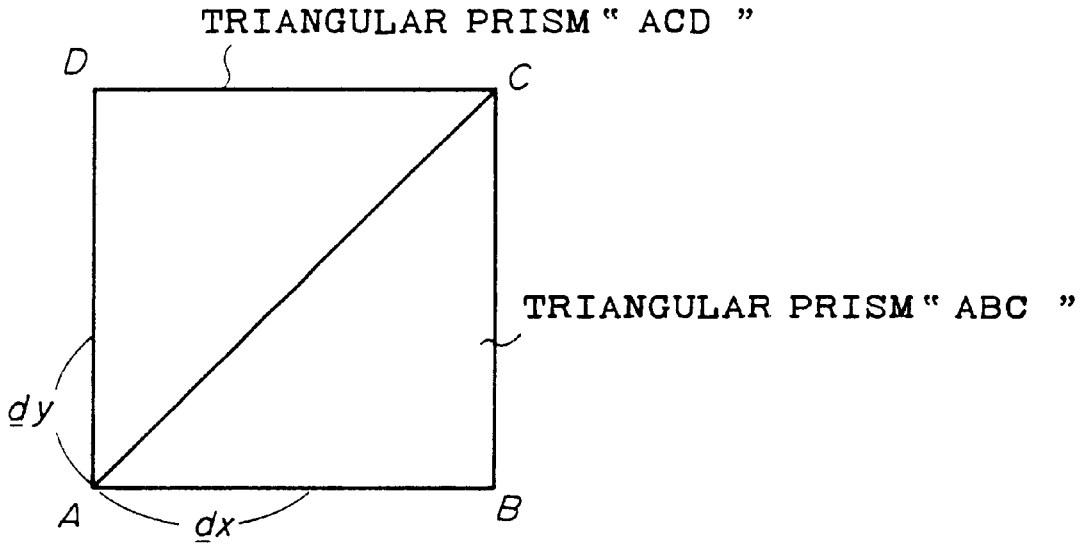

Next, a detailed description will be given of a selection method for selecting type-1 triangular prisms, with reference to FIGS. 8A, 8B and 9. FIG. 8A shows a unit cube selected from the plural unit cubes based on the data (x, y, z) at higher bits of the input signals X, Y and Z, and FIG. 8B shows two triangular prisms in a top view of the selected unit cube having four ridges A, B, C and D (which extend vertically along the Z axis in XYZ space). In this case, the two ridges A and C, to form part of a triangular prism to be selected, are chosen based on the data (x, y, z) at higher bits of the input signals X, Y and Z, the remaining ridge (B or D), to form part of the triangular prism, is chosen based on the data (x, y, z) at higher bits of the signals X, Y and Z and based on the relationship in magnitude between the data ($\underline{d}x$, $\underline{d}y$) at lower bits of the signals X and Y. For example, if $\underline{d}x \geqq \underline{d}y$, the ridge B is chosen as the remaining ridge of the triangular prism to be selected.

Figure 9:
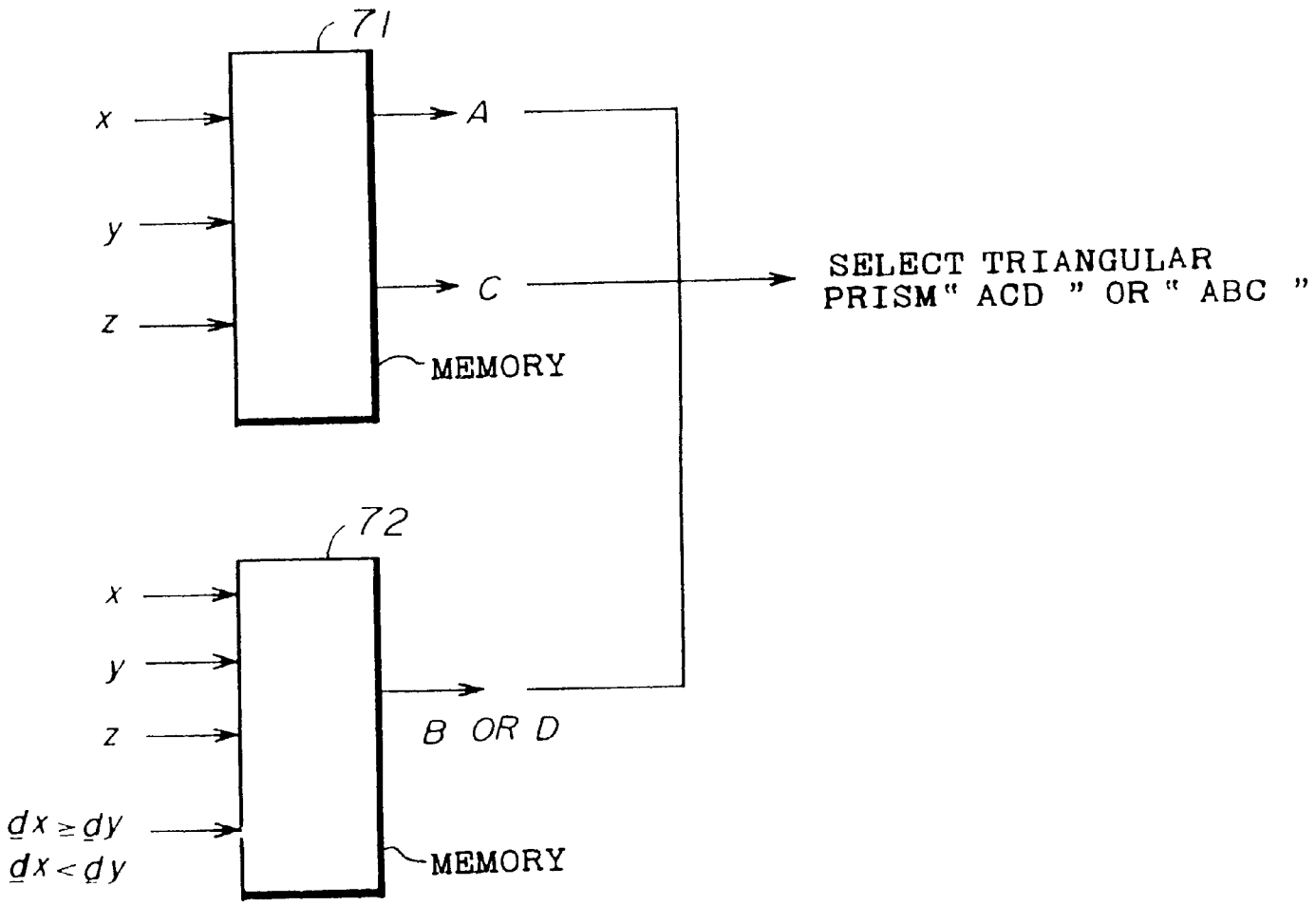
FIG.9 is a diagram for explaining a signal generating process in which a select signal is generated for selecting a type-1 triangular prism.

FIG. 9 shows a detailed structure of the selection/memory part 100 for generating a select signal to select the type-1 triangular prism based on the input signals X, Y and Z. The selection/memory part 100 includes two memories 71 and 72. Based on the data (x, y, z) at higher bits of the input signals, predetermined ridge data is read out from the memory 71, and the two ridges (A, C) of the triangular prism are selected. Based on the data (x, y, z) at higher bits of the input signals and a relationship in magnitude between the data ($\underline{d}x$, $\underline{d}y$) at lower bits of the input signals, predetermined ridge data is read out from the memory 72, and the remaining ridge of the triangular prism is selected. For example, if $\underline{d}x \geqq \underline{d}y$, predetermined ridge data for selecting the ridge B as the remaining ridge which forms part of the triangular prism "ABC" is read out from the memory 72. If $\underline{d}x < \underline{d}y$, predetermined ridge data to select the ridge D a the remaining ridge to form the triangular prism "ACD" is read out from the memory 72. From such ridge data, the selection/memory part 100 generates a select signal to indicate whether the triangular prism "ABC" or the triangular prism "ACD" is selected.

Figure 10A:
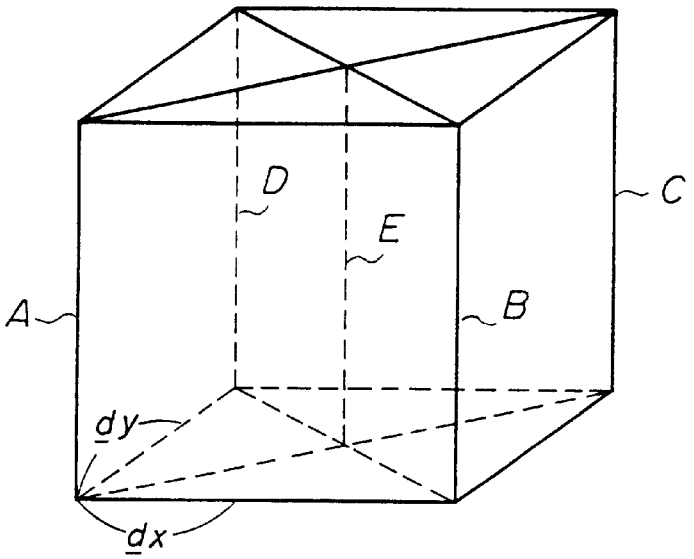
FIGS.10A and 10B are diagrams for explaining a selection process according to the invention to select a type-2 triangular prism based on input signals.
Figure 10B:
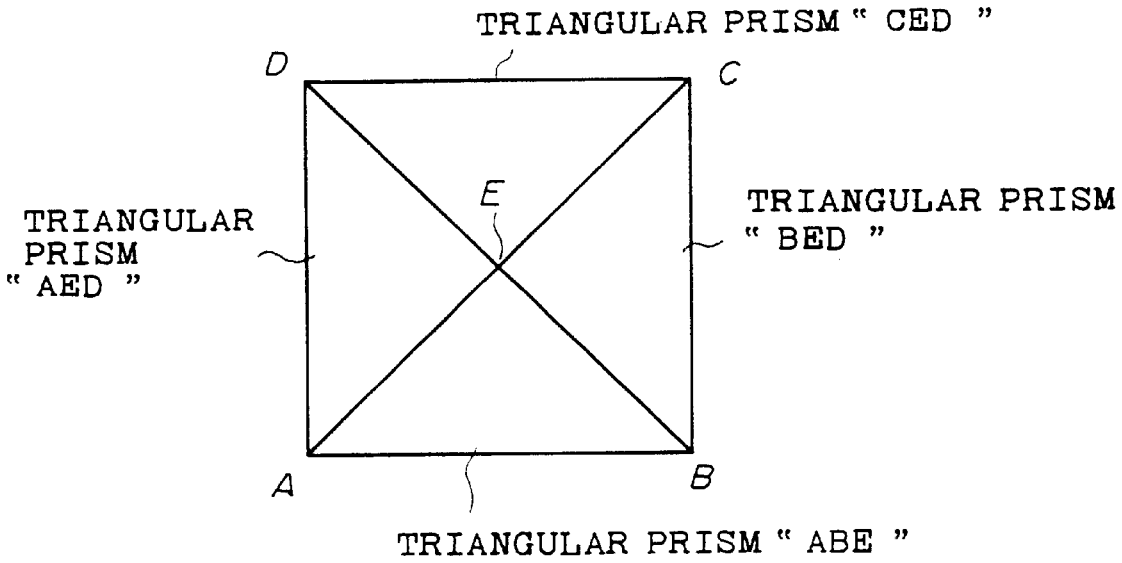

In addition, a detailed description will be given of a selection method for selecting type-2 triangular prisms, with reference to FIGS.10A, 10B and 11. Similarly to the type-1 method described above, FIG.10A shows a unit cube selected from the plural unit cubes based on the data (x, y, z) at higher bits of the input signals X, Y and Z. FIG.10B shows four triangular prisms in a top view of the selected unit cube. Each of the triangular prisms has a center ridge E passing through a center line extending vertically along the Z axis in XYZ space. The ridge E of each of the triangular prisms is chosen based on the data (x, y, z) at higher bits of input signals X, Y, Z. The remaining two ridges which form part of each of the triangular prisms are chosen based on the data (x, y, z) at higher bits of the signals X, Y, Z and based on the relationship between the data ($\underline{d}x$, $\underline{d}y$) at lower bits of the signals X, Y.

Figure 11:
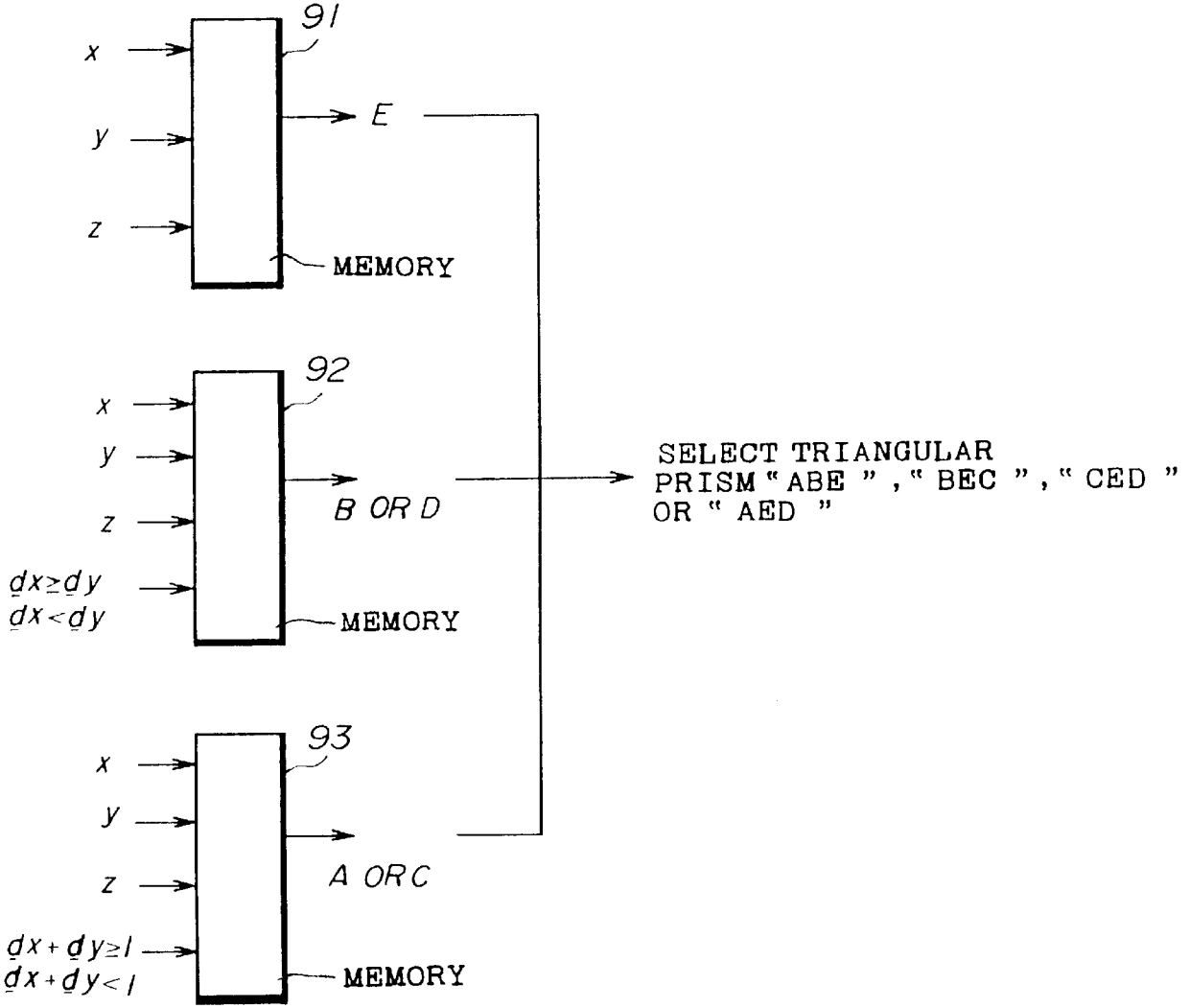
FIG.11 is a diagram for explaining a signal generating process in which a select signal is generated for selecting a type-2 triangular prism.

FIG.11 shows a detailed structure of the selection/memory part 100 for generating a select signal to select type-1 triangular prisms, based on the input signals X, Y and Z. This selection/memory part 100 includes three memories 91, 92 and 93. Based on the data (x, y, z) at higher bits of the input signals, predetermined ridge data is read out from the memory 91 so as to select the center ridge E of each of the type-2 triangular prisms. Based on the data (x, y, z) at higher bits of the input signals and a relationship in magnitude between the data ($\underline{d}x$, $\underline{d}y$) at lower bits thereof, predetermined ridge data is read out from the memory 92 so as to select the second ridge B to form part of the triangular prism of $\underline{d}x \geqq \underline{d}y$, or so as to select the second ridge D to form part of the triangular prism if $\underline{d}x < \underline{d}y$. Similarly, based on the data (x, y, z) at the higher bits of the input signals and a relationship indicated by the data ($\underline{d}x$, $\underline{d}y$) at the lower bits thereof, predetermined ridge data is read out from the memory 93 so as to select the remaining ridge C to form part of the prism if dx+dy≧1, or so as to select the remaining ridge A if dx+dy<1. From these ridge data, the selection/memory part 100 generates a select signal to select the triangular prism "ABE", "BEC", "CED" or "AED".

The capacity of the memories required when the type-2 method is applied is smaller than the capacity of the memories required when the type 1 method is applied, if the number of lattice points is the same for the two methods. Application of the type-2 method is advantageous for a color copier in which high-speed processing is needed. In the following description, will be described a case in which the type-1 method is applied. A case in which the type-2 method is applied is essentially the same as the type-1 method case, but only the values of the coefficients a, b, c, when the interpolation is done on a triangle section by applying the type-1 method, differ from those values of the coefficients obtained by applying the type-2 method.

Interpolation In Triangular Prism Ridge

Before interpolation is done in a triangle section of a selected triangular prism, it is necessary to decide what data is predetermined with respect to each unit triangular prism stored in the selection/memory 100. There are two methods which are usable for this purpose. One of the two methods is to predetermine the respective output values with respect to six vertex points of each unit triangular prism and store them beforehand in the selection/memory part 100. In such a case, when it is assumed that two output values Pl and P2 are predetermined with respect to two vertex points of a ridge of a selected unit triangular prism, output data Pa corresponding to the data dz at the lower bits of input signal Z is obtained, as follows.

$$Pa=P2+dz(P2-P1) \tag{6}$$

Figure 12:
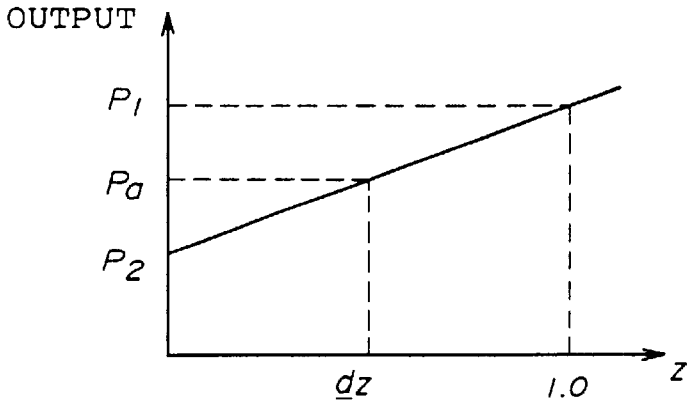
FIG.12 is a chart for explaining a linear interpolation done in a triangle.

The above is shown in FIG.12. The other output data pb and Pc, Corresponding to the data dx and dy at the lower bits of the input signals X and Y, are obtained in a similar manner.

When it is assumed that two output values P1 and P2 ar predetermined with respect to two vertex points of one ridge of a selected unit triangular prism, this second method is to predetermine a gradient factor "ai" (which corresponds to (P2−P1)) and an intercept factor "bi" (which corresponds to P2), and store these factors beforehand in the selection/memory part 100. This second method has an advantageous feature that no subtracter is needed for calculating the data corresponding to (P2−P1). Thus, this second method is used by the interpolation method of the invention.

As shown in FIG.3, in the selection/memory part 100 and the first interpolation part 200 of the invention, a triangular prism is chosen based on the data (x, y, z) at the higher bits of the input signals X, Y and Z and based on the data (dx, dy, dz) at the lower bits thereof. The selection/memory part 100 reads out, from the memories thereof, a set of signals indicating gradient and intercept factors (a1, b1), (a2, b2) and (a3, b3) with respect to first, second and third ridges of the selected unit triangular prism, and supplies the signals indicating these factors to the first interpolation part 200. Based on the signals supplied by the selection/memory part 100, the first interpolation part 200 calculates Px=ai dz+bi (i=1, 2, 3; Px=Pa, Pb, Pc), and outputs the resulting data Pa, Pb, Pc obtained through linear interpolation on the ridges of the unit triangular prism.

Interpolation In Triangle Section

Figure 13:
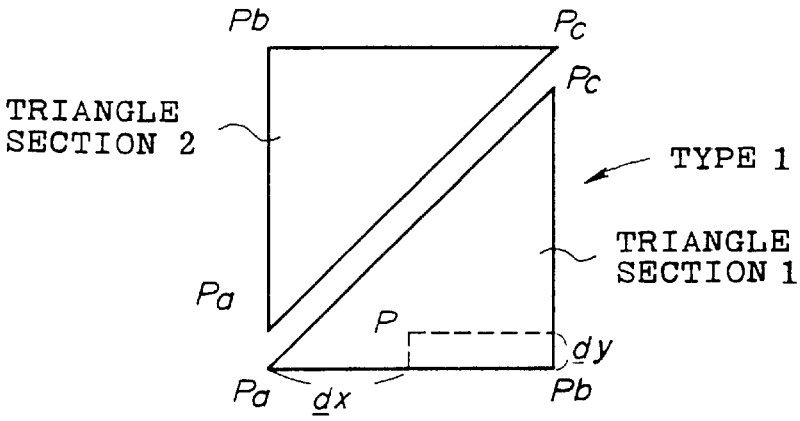
FIG.13 is a diagram for explaining a linear interpolation done in a triangle section of a selected type-1 triangular prism.

The second interpolation part 300, as shown in FIG.3, generates the final output data P through linear interpolation based on the segment ratios which are obtained from the output data Pa, Pb and Pc supplied by the first interpolation part 200. FIG.13 is a diagram for explaining linear interpolation which is done in a triangle section of a selected type-1 triangular prism. As shown in FIG.13, if dx>dy, the output data P lies within a triangle section 1 of the unit triangular prism "ABC", and the output data P is obtained through linear interpolation in the triangle section 1 as follows.

$$P=(Pb-Pa)dx+(Pc-Pb)dy+Pa \tag{7}$$

Similarly, if dx<dy, the output data P lies within a triangle section 2 of the unit triangular prism "ACD" and the output data P is obtained through linear interpolation in the triangle section 2 as follows $$P=(Pc-Pb)dx+(Pb-Pa)dy+Pa \tag{8}$$

As shown in FIG.3, in the second interpolation part 300 of the invention, the subtracters 301 and 302 calculate difference data (Pb−Pa) and (Pc−Pb), from the output data Pa, Pb, Pc supplied by the first interpolation part 200, and the calculated data (Pb−Pa) and (Pc−Pb) are supplied to the multiplexer 303. The multiplexer 303 performs different operations depending on control signal indicating dx≧dy or dx<dy. If [dx dy] *dx≧dy*, the multiplexer 303 supplies difference data (Pb−Pa) and (Pc−Pb) to the multipliers 304 and 305. Data equivalent to (Pb−Pa) dx is supplied by the multiplier 304 and data equivalent to (Pc−Pb) dy is supplied by the multiplier 305 to the adder 306. And, the final output data P is generated by the adder 306 from the data from the multipliers 304 and 305 and the adder 202. If dx<dy, the multiplexer 304 supplies difference data (Pc−Pb) and (Pb−Pa) to the multipliers 304 and 305. Data equivalent to (Pc−Pb) dx is supplied by the multiplier 304 to the adder 306 and data equivalent to (Pb−Pa) dy is supplied by the multiplier 305 to the adder 306. And, the final output data P is generated by the adder 306 from the data generated by the multipliers 304, 305 and the adder 202. The output data P corresponds to, for example, a yellow signal Y indicating yellow ink quantity. By means of color correction devices having the same construction as that shown in FIG.3, magenta and cyan signals indicating magenta and cyan ink quantities can be generated.

Figure 14:
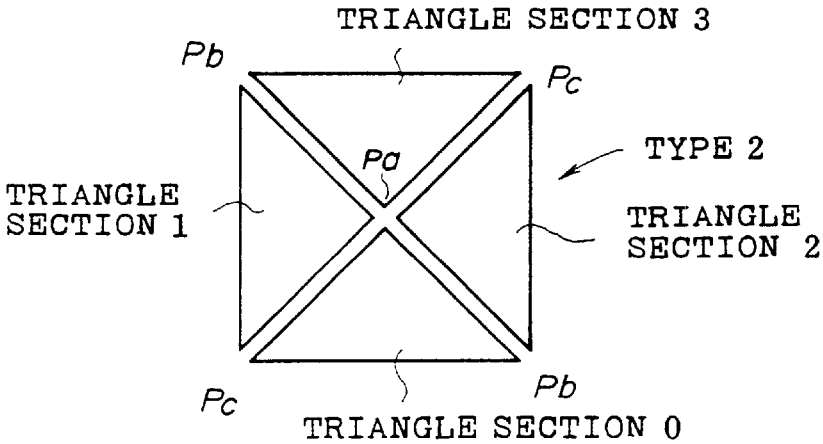
FIG.14 is a diagram for explaining a linear interpolation done in triangle sections 0 to 3 of a selected type-2 triangular prism.

The above linear interpolation calculated by the second interpolation part 300 can be represented by a formula: P=adx+bdy+c. The coefficients, a, b and c in the above case differ from those when the linear interpolation is calculated with respect to type-2 unit triangular prisms. FIG. 14 is a diagram for explaining linear interpolation done in triangle sections "0" to "3" of the type-2 triangular prisms, and the coefficients a, b and c used in the formula in this case are as follows. It is assumed that output data corresponding to vertex points A, B and C of each of the triangle sections are Pa, Pb and Pc, respectively. The coefficients a, b and c in the triangle section "0" corresponds to the data (Pb−Pc), (2Pa−Pb−Pc) and (Pc), the a, b and c in the triangle section "1" correspond to the data (2Pa−Pb−Pc), (Pb−Pc) and (Pc), the a, b and c in the triangle section "2" correspond to the data (Pb+Pc−2Pa), (Pc−Pb) and (2Pa−Pc), the a, b and c in the triangle section "3" correspond to the data (Pc−Pb), (Pb+Pc−2Pa) and (2Pa−Pc), respectively. The above linear interpolation is calculated by applying these coefficients to the triangle sections "0" to "3".

Figure 15:
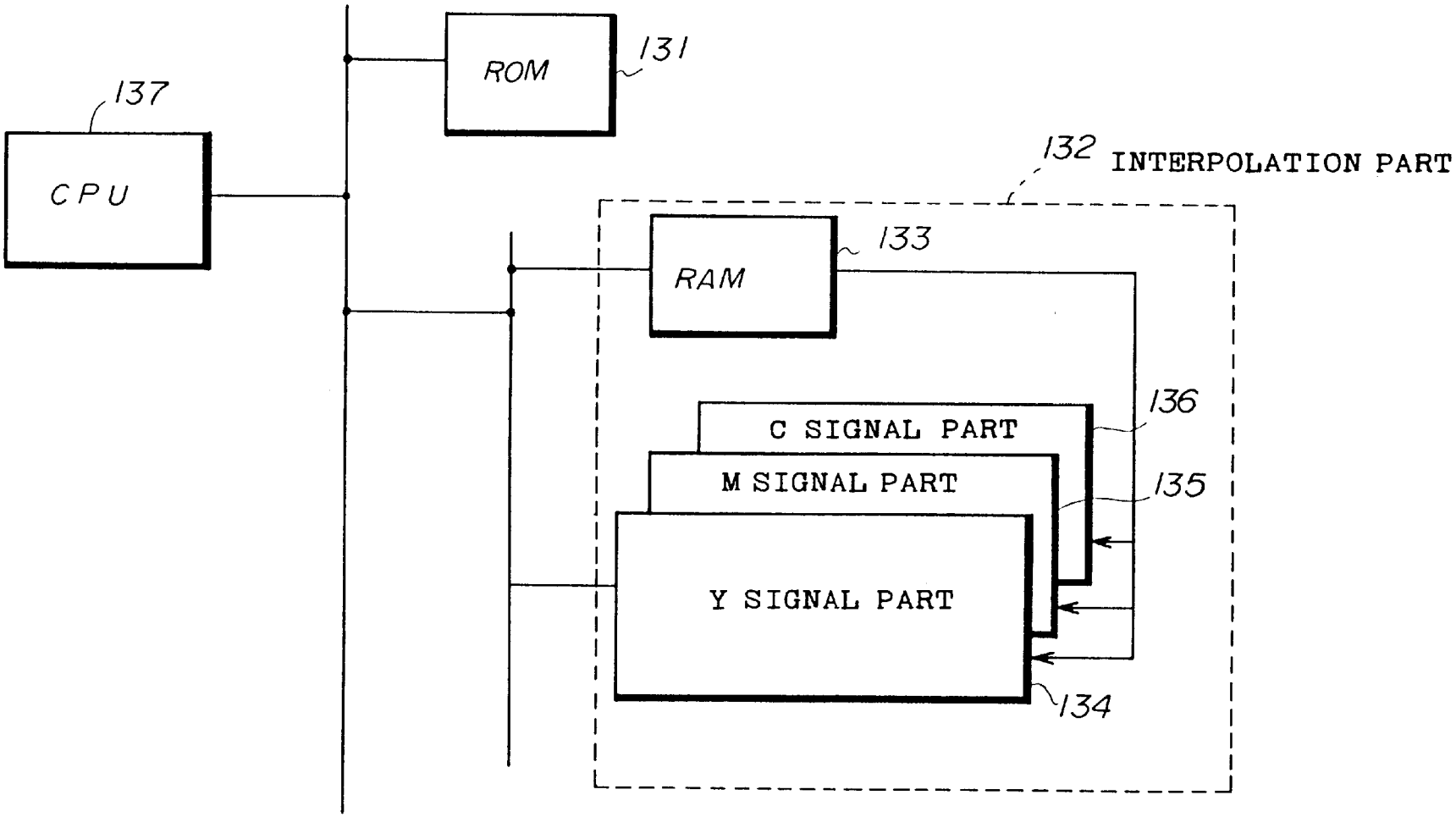
FIG.15 is a block diagram showing a construction of a color correction apparatus in a second embodiment of the present invention.

Next, a description will be given of a lo color correction apparatus in a second embodiment of the present invention, with reference to FIG.15. In FIG.15, this color correction apparatus includes a read-only memory (ROM) 131, an interpolation part 132 having a random access memory (RAM) 133, a Y signal part 134, an M signal part 135 and a C signal part 136, and a central processing unit (CPU) 137. In the ROM 131, predetermined output data corresponding to lattice points in a triangular prism is stored. For example, when input signals X, Y and Z are divided into four parts, the output data stored in the ROM 131 has a storage capacity equivalent to 64 bytes per color signal. The interpolation part 132 having a construction like that of the first interpolation part 200 or the second interpolation part 300 shown in FIG.3 loads the predetermined lattice point data corresponding to the lattice points, stored in the ROM 131, into the RAM 133 when color correction is started. By making reference to the data loaded in the RAM 133, the Y, M and C signal parts 134, 135 and 136 generate yellow, magenta and cyan output signals Y, M, C based on the input signals R, G and B. The CPU 137 is a main control part of the apparatus shown in FIG.15 for controlling operations of the interpolation part 132 and the ROM 131.

In this second embodiment, a case is considered in which simultaneous access is given to the data in the ROM 131 corresponding to adjacent lattice points of a triangular prism. When color correction is performed, an overlaying part of the lattice point data (equivalent to storage capacity of 512 bytes) in the ROM 131 is loaded into the RAM 133 by the interpolation part 132. According to this second embodiment, it is possible to store the lattice point data having a very small storage capacity in the ROM 131, thus allowing a read-only memory having a small storage capacity to be used.

Figure 16:
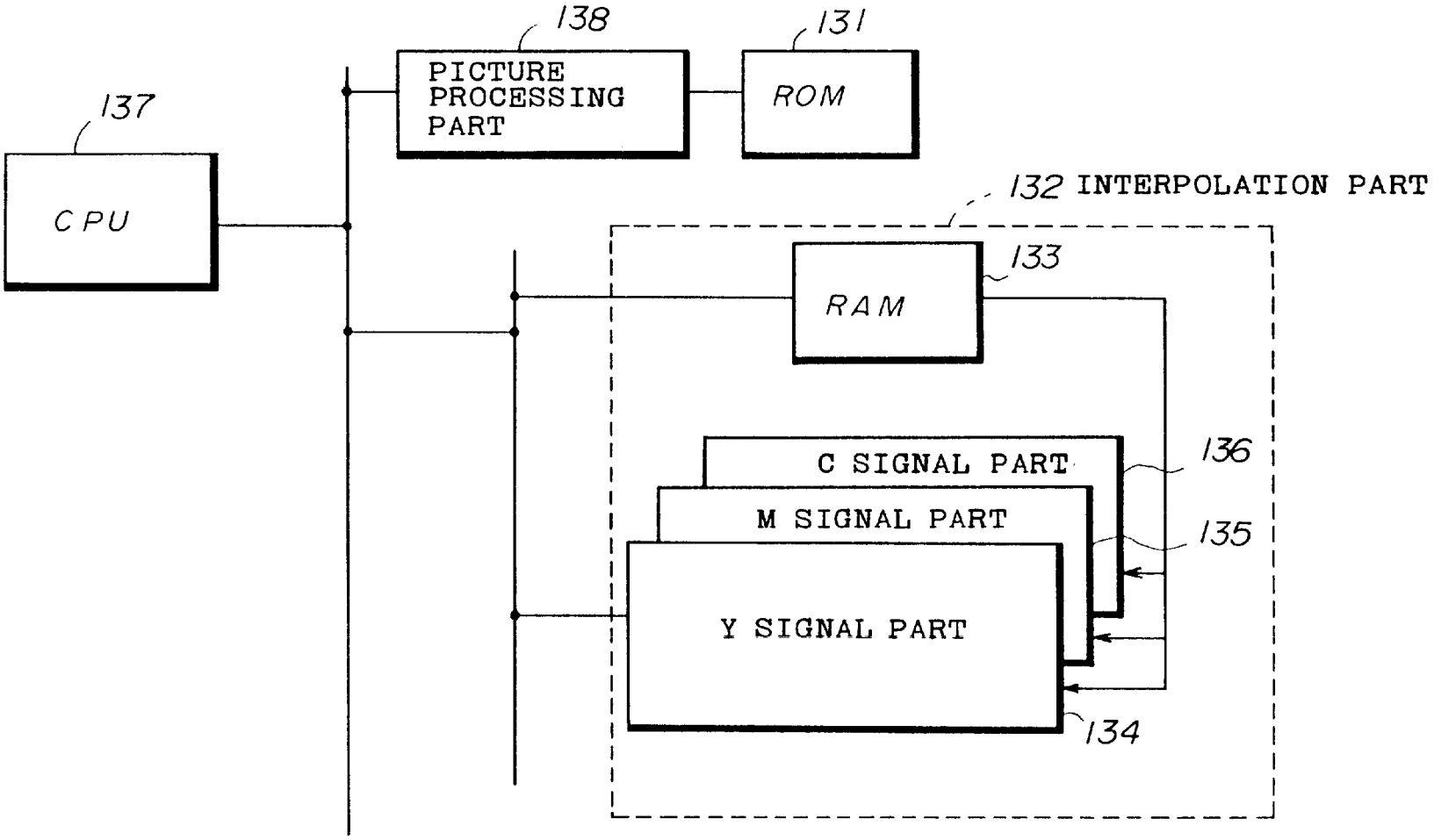
FIG. 16 is a block diagram showing a construction of a color correction apparatus in a third embodiment of the present invention.

FIG.16 shows a color correction apparatus is a third embodiment of the present invention. In FIG.16, this color correction apparatus has a construction that is essentially the same as the second embodiment described above, except that the color correction apparatus shown in FIG.16 includes a picture processing part 138 For example, this picture processing part 130 performs color correction or adjustment of the lattice point data stored in the ROM 131, thereby allowing the color correction apparatus of the third embodiment to perform color correction flexibility.

Next, a description will be given of a color correction apparatus in a fourth embodiment of the present invention. In the above mentioned embodiments, lattice point data Pi (i=1 to 6) corresponding to lattice points of a triangular prism are predetermined. However, in this fourth embodiment, a setting method to predetermine output data corresponding to lattice points of a triangular prism is used for interpolation, and this setting method can be used appropriately with space division type interpolation. The conventional setting method described above is selected and used so as to achieve accurate interpolation results within unit regions, but such results are realized only when the number of tetrahedrons into which XYZ space is divided is large enough. If XYZ space is divided into a very small number of tetrahedrons, the conventional setting method does not achieve accurate interpolation results. Also, the conventional method has a problem in that the YMC correction values corresponding to the lattice points of the tetrahedrons are predetermined regardless of whether or not the number of such tetrahedrons is large enough.

The setting method according to the present invention is used suitably in a space-division type interpolation as mentioned above. This setting method can produce accurate interpolation results even when XYZ space is divided into a small number of triangular prisms. A detailed description of this setting method will now follow. It is to be noted that the present invention is not limited to this embodiment, but applicable to 8-point or 4-point interpolation.

In a known digital color copier, a gamma conversion is performed of color pattern data which is previously classified in 16 stages as input data, and a half tone process of such a conversion data is performed so as to generate output signals Y, M and C with 256 halftone data. A hardcopy is produced by the output signals Y, M and C with 256 halftone data. This hardcopy is scanned by a scanner, and density data (R, G, B) is measured from the scanned data for each hardcopy. A relationship between the output signals (Yp, Mp, Cp) and the density data (Rp, Gp, Bp) is thus obtained (p: color patch number). A set of coefficients of a linear function is obtained by applying the least square method to small unit regions. Such coefficients are used in the linear function, and output data corresponding to lattice points in the unit regions is calculated and predetermined by using the linear function including the coefficients.

More specifically, X, Y and Z axes are divided respectively into L segments, M segments and N segments so that XYZ space is divided into plural rectangular parallelopipeds. Each of them is further divided into two halves so that two unit triangular prisms are formed. Assuming that values of input coordinates x, y and z range from 0 to 255, the lengths of three ridges of each unit triangular prism along X, Y and Z axes are respectively represented by dx=256/L, dy=256/M, dz=256/N. In this embodiment, lattice point values Pi,j,k (i=0 to L, j=0 to M, k=0 to N, P=Y, M or C) corresponding to lattice points of a unit triangular prism are predetermined. The x, y and z coordinates of the lattice point data Pi,j,k are represented as follows.

$$(x, y, z)=(i\,\underline{d}x,\ j\,\underline{d}y,\ k\,\underline{d}z) \tag{9}$$

Suppose the following equations:

$$dx\ ijk=(x-i\,\underline{d}x)/\underline{d}x,$$

$$dy\ ijk=(y-i\,\underline{d}y)/\underline{d}y,$$

$$dz\ ijk=(z-i\,\underline{d}z)/\underline{d}z \tag{10}$$

A function D(1) ijk is defined in such a way that D(1) ijk is equal to 1 when a point at x, y, z coordinates is located within a unit triangular prism including a point (i $\underline{d}$x, j $\underline{d}$y, k $\underline{d}$z) as the starting point, and D(1) ijk is equal to ) when the point at x, y, z coordinates is located outside the unit triangular prism 1. Thus, the area in which D(1) ijk=1 is satisfied is represented by $$i\underline{d}x \leq x < (i+1)\underline{d}x,$$

$$j\underline{d}y \leq y < (j+1)\underline{d}y,$$

$$k\underline{d}z \leq x < (k+1)\underline{d}z,$$

$$dy\ ijk < dx\ ijk \tag{11}$$

The area represented by the above formula (11) is included in either the triangular prism ABC shown in FIGS.8A and 8B, or the triangle section 1 shown in FIG.13. A function D(2) ijk is defined in such a way that D(2) ijk is equal to 1 when a point x, y, z coordinates in XYZ space is located within an area of a unit triangular prism 2 including a point (i $\underline{d}$x, j$\underline{d}$y, k$\underline{d}$z) as the starting point, and D(2) ijk is equal to 0 when the point at x, y, z coordinates in XYZ space is located outside the unit triangular prism 2. Thus, the area in which D(2) ijk=1 is satisfied is represented by $$i\underline{d}x \leqq x < (i+1)\underline{d}x,$$

$$j\underline{d}y \leqq y < (j+1)\underline{d}y,$$

$$k\underline{d}z \leqq x < (k+1)\underline{d}z,$$

$$dy\ ijk \geqq dx\ ijk \tag{12}$$

The area of XYZ space represented by the formula (12) is included in either the triangular prism ACD shown in FIGS.8A and 8B, or the triangle section 2 shown in FIG.13.

Figure 17:
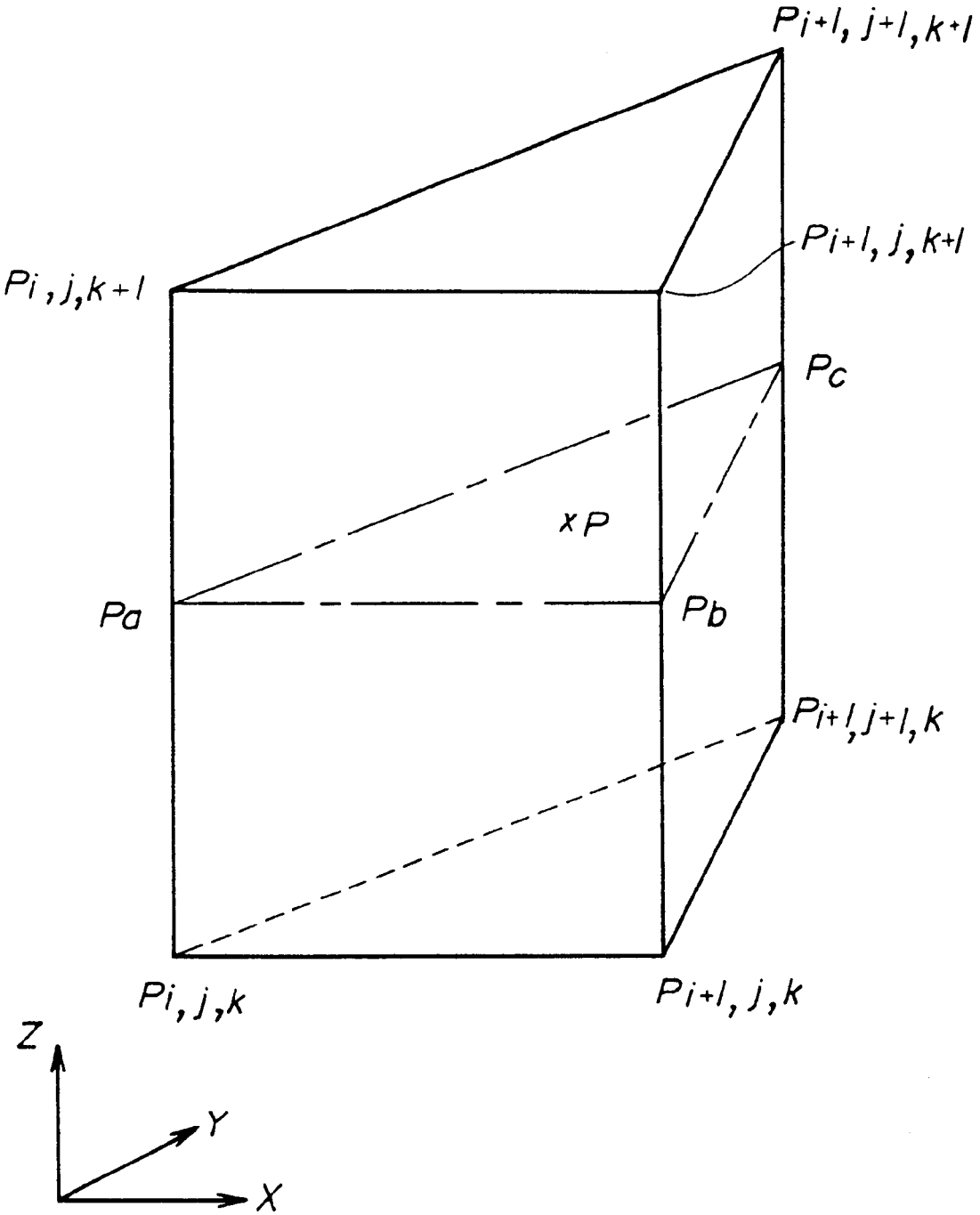
FIG. 17 is a diagram for explaining a setting method for presetting output data corresponding to lattice points of a triangular prism in RGB space.

FIG.17 shows a unit triangular prism in which D(1) ijk=1 (dy ijk<dx ijk) is satisfied. The lattice point data corresponding to the six lattice points of the unit triangular prism is shown in FIG.17. Output data Pa, Pb and Pc included in an intersecting plane between the triangular prism and a triangle section that satisfies x, y and z coordinates of the output P, are obtained through interpolation in a ridge of the triangular prism based on the lattice point data, as follows.

$$Pa = P\ i, j, k + dz\ ijk\ (P\ i, j, k+1 - P\ i, j, k), \tag{13}$$

$$Pb = P\ i+1, j, k + dz\ ijk\ (Pi+1, j, k+1 - Pi+1, j, k),$$

$$Pc = Pi+1, j+1, k + dz\ ijk\ (Pi+1, j+1, k+1 - Pi+1, j+1, k)$$

Hence, the output P is obtained through linear interpolation which is done in a triangle section based on the output data Pa, Pb and Pc which are calculated by the formula (13), as follows.

$$\begin{aligned} P(Y, M, C) = {} & (Pb - Pa)dx\,ijk + (Pc - Pb)dy\,ijk + Pa = dx\ ijk\ dz\ ijk \\ & (Pi+1, j, k+1 - Pi+1, j, k - Pi, j, k+1 + Pi, j, k) + \\ & dx\ ijk(Pi+1, j, k - Pi, j, k) + dy\ ijk\ dz\ ijk\,(Pi+1, j + \\ & 1, k - Pi+1, j+1, k - Pi+1, j, k+1 + Pi+1, j, k) + \\ & dy\,ijk(Pi+1, j+1, k - Pi+1, j, k) + Pi, j, k + dz \\ & ijk\ (Pi, j, k+1 - Pi, j, k). \end{aligned} \tag{14}$$

The above formula (14) can be rewritten as follows.

$$\begin{aligned} P(Y, M, C) = {} & Pi, j, k(dx\,ijk\,dz\,ijk - dx\,ijk - dz\,ijk + 1) + \\ & Pi+1, j, k(dx\,ijk - dx\,ijk\,dz\,ijk - dy\,ijk + dy\,ijk\,dz\,ijk) + \\ & Pi+1, j+1, k(dy\,ijk - dy\,ijk\,dz\,ijk) + \\ & Pi, j, k+1(dz\,ijk - dx\,ijk\,dz\,ijk) + Pi+1, j, k + \\ & 1(dx\,ijk\,dz\,ijk - dy\,ijk\,dz\,ijk) + Pi+1, j+1, k+1(dy\,ijk\,dz\,ijk) \end{aligned} \tag{15}$$

A similar calculation with respect to another unit triangular prism that satisfied D(2) ijk=1 (dy ijk≧dx ijk) can also be made, and the output P is represented using D(1) ijk and D(2) ijk, as follows.

$$\begin{aligned} P = \Sigma[ & D(1)ijk(Pi, j, k(dx\,ijk\,dz\,ijk - dx\,ijk - dz\,ijk + 1) + Pi + \\ & 1, j, k(dx\,ijk - dx\,ijk\,dz\,ijk - dy\,ijk + dy\,ijk\,dz\,ijk) + \\ & Pi+1, j+1, k(dy\,ijk - dy\,ijk\,dz\,ijk) + \\ & Pi, j, k+1(dz\,ijk - dx\,ijk\,dz\,ijk) + Pi+1, j, k + \\ & 1(dx\,ijk\,dz\,ijk - dy\,ijk\,dz\,ijk) + Pi+1, j+1, k+1(dy\,ijk\,dz\,ijk)) \end{aligned} \tag{16}$$

-continued $$\begin{aligned} & D(2)ijk(Pi, j, k(-dx\,ijk + dy\,ijk\,dz\,ijk - dz\,ijk + 1) + \\ & Pi+1, j+1, k(dx\,ijk - dx\,ijk\,dz\,ijk) + Pi, j + \\ & 1, k(dx\,ijk\,dz\,ijk - dx\,ijk + dy\,ijk - dy\,ijk\,dz\,ijk) + \\ & Pi, j, k+1(dz\,ijk - dy\,ijk\,dz\,ijk) + Pi + \\ & 1, j+1, k+1(dx\,ijk\,dz\,ijk) + Pi, j+1, k + \\ & 1(dy\,ijk\,dz\,ijk - dx\,ijk\,dz\,ijk)))] = \Sigma f\ ijk(x, y, z)Pi, j, k \end{aligned}$$

The above formula is a linear function expressed in a linear form of the lattice point data Pi,j,k, as indicated in the formula (16), and the least square method is suitably applicable to this linear function. This means that the coefficients of the linear function ar determined through the least square method by using the results of the color pattern data, and the lattice point values are calculated by using the linear function including the coefficients thus determined.

Generally speaking, in the above relationship between the output signals (Yp, Mp, Cp) and the density data (Rp, Gp, Bp), some density data do not exist continuously in RGB space and there are unit areas of RGB space in which no corresponding data exists. In such areas of RGB space, no solution of the output P can be obtained. To avoid this problem, it is necessary to insert supplementary data in such areas of RGB space. According to the present invention, supplementary data obtained from a non-linear function is inserted in corresponding unit areas in which little output data exists, and supplementary data obtained from a linear function is inserted in corresponding unit areas in which no output data exists.

Figure 18:
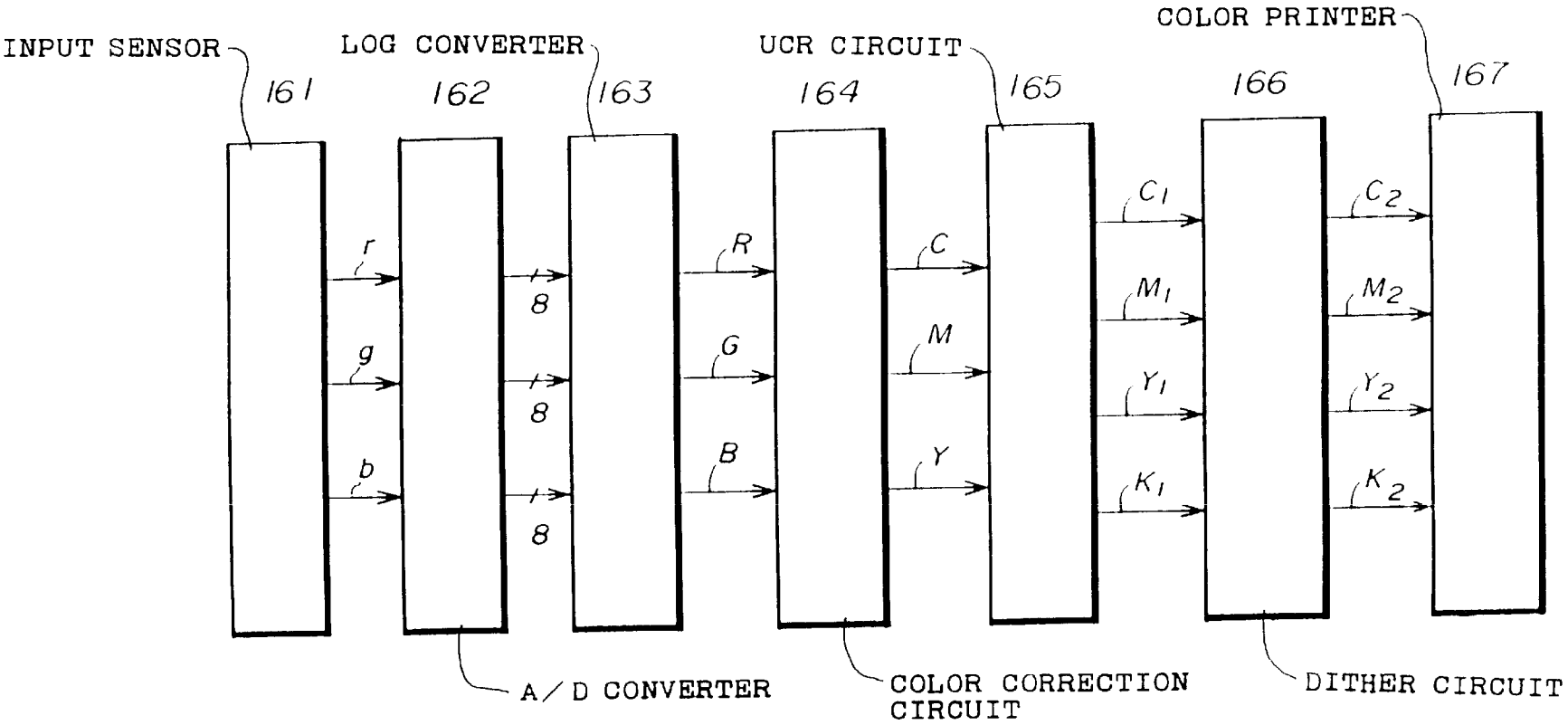
FIG. 18 is a block diagram showing a construction of a color copier to which the color correction method using interpolation of the present invention is applied.

Next, a description will be given of a fifth embodiment of the present invention. The color correction method in this fifth embodiment is directed to improvement of the quality of reproduced images whose coordinates lie in peripheral areas of RGB space. FIG.18 shows a construction of a color copier to which the present invention is applied. In lo FIG.18, an input sensor 161 has photoelectric conversion elements such as charge-coupled devices (CCDs), and this input sensor scans a color document by scanning light so that red, green and blue input signals (R, G, B) are generated by the input sensor 161 from the scanned color document. An analog-to-digital converter (A/D converter) 162 converts the analog signals (R, G, B) from the input sensor 161 into digital signals, which are, for example, 8-bit digital signals. A log converter 163 performs conversion of the density of the digital RGB signals from the A/D converter 162 to output density data R, G, B.

A color correction circuit 164 in the color copier shown in FIG.18 is a circuit to which the color correction method of the invention is applied. This color correction circuit 164 generates Y, M, C ink quantity signals based on the R, G, B density data supplied by the log converter 163. More specifically, RGB space is divided into plural unit cubes, and color correction data with respect to eight lattice points of each of the unit cubes is predetermined through the least square method. Such predetermined color correction data (Y, M and C values) corresponding to the eight lattice points of each unit cube are stored beforehand in a memory or table. Color correction values corresponding to input RGB signals whose density data is located at intermediate points between two lattice points of each unit cube, are obtained through linear interpolation of the predetermined color correction values stored in the memory so that Y, M and C ink quantity signals are generated by the color correction circuit 164.

A UCR circuit 165 in the color copier shown in FIG.18 is a circuit which performs under-color removal process. This UCR circuit 165 generates Y1, C1 and M1 ink quantity signals, to which the under-color removal process is performed partially or totally, and generates a K1 black ink quantity signal, based on the Y, M and C signals supplied by the color correction circuit 165. The ink quantity signals Y1, M1, C1 and K1 generated by the UCR circuit 165 are represented by the following formulas.

$$K=\underline{a}=\min(Y,M,C),$$

$$Y1=Y-K,\ M1=M-K,\ C]=C-K \qquad (17)$$

In the formulas (17), a is a given coefficient which is equal to, for example, 0.5. The UCR circuit 165 allows the reproduced image to have a clearly reproduced black ink area especially in a high-concentration area, such a clear black area whose density is determined by the black ink quantity signal cannot be reproduced by combining three Y, M, C ink quantity signals. Thus, it is possible to make visual appearance of dark areas in a reproduced image very clear, and efficiently reduce the total quantity of ink used.

A dither circuit 166 is a circuit that binarizes the Y1, M1, C1 and K1 ink quantity signals, supplied by the UCR circuit 165, through application of a structural dither method. This dither circuit 166 generates such binary ink quantity signals Y2, M2, C2 and K2, and supplies each bit indicated by the signals to a color printer 167 one by one, so that a color image is reproduced by a on/off control of each ink dot for each color.

A detailed description will be given of a setting method to preset output data corresponding to eight lattice points of a triangular prism, which is used for the interpolation method in this fifth embodiment of the invention. In the color copier shown in FIG.18, density data (R, G, B) for the color pattern data is measured from Y, M and C color signals supplied by the color correction circuit 164 before the UCR process is performed. The Y, M and C color signals include 4913 (=$17^3$) data which are obtained by dividing halftone levels of color signals (Y, M, C) (each having bits indicating 256 halftone levels) in 16 stages, as follows.

Y: 0, 15, 31,..., 239, 255
M: 0, 15, 31,..., 239, 255
C: 0, 15, 31,..., 239, 255

Figure 19:
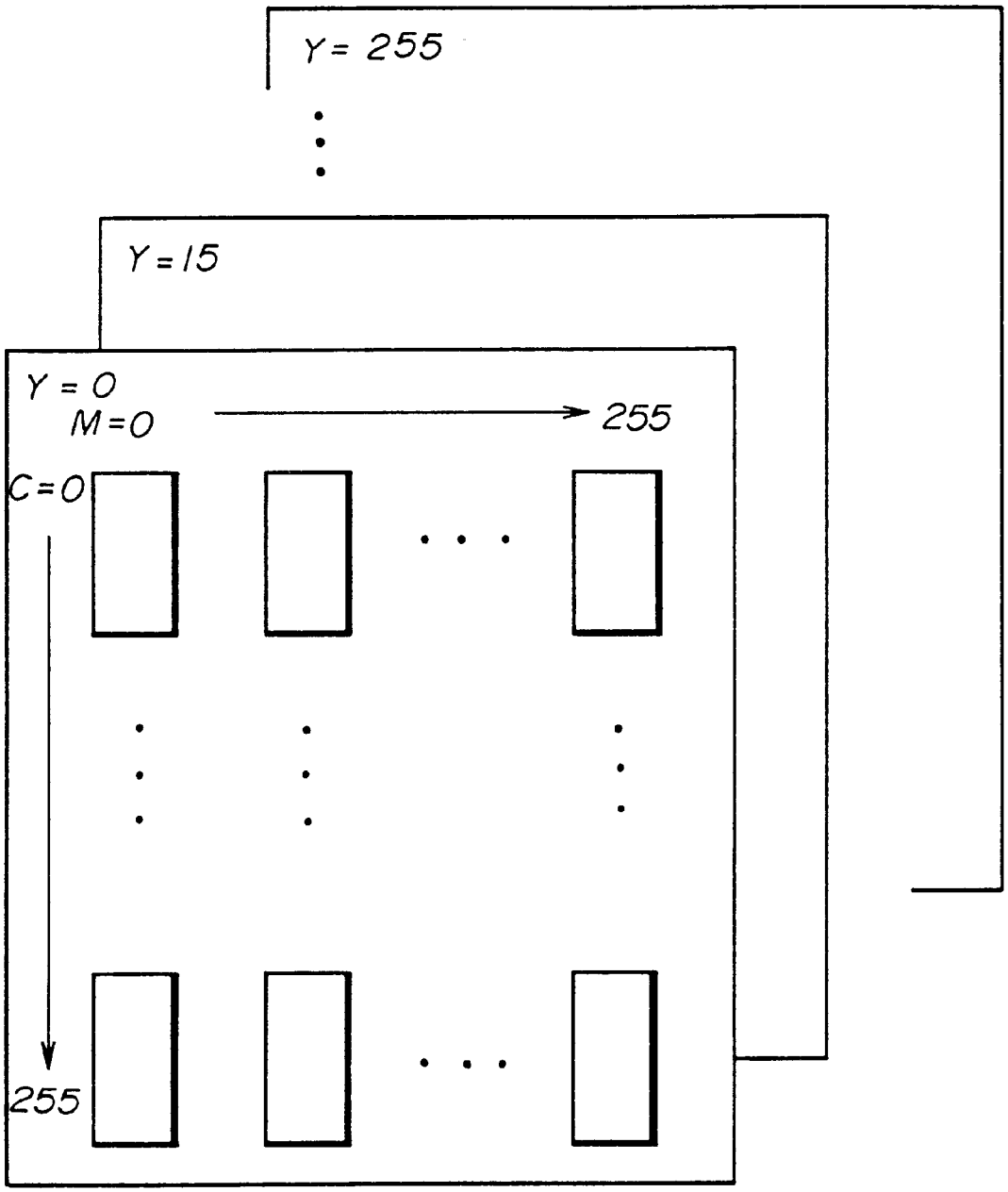
FIG. 19 is a diagram showing an example of output data when color pattern data is scanned.

FIG.19 shows an example of output data which are obtained by scanning the 4913 color pattern data (color patch data) and measuring the results of color correction performed by the color copier shown in FIG.18. The output data is used as the predetermined color correction data (Y, M, C) corresponding to the lattice points of the triangular prisms.

By scanning each of the color pattern data by means of the input sensor 161, the color correction circuit 164 receives each of the scanned color pattern data via the A/D converter 162 and the log converter 163, and generates Y, M, C ink quantity signals of the color pattern data, so that R, G, B density data is measured from Y, M, C color signals for each of the color pattern data. Thus, a relationship between the output signals (Y, M, C) and the 4913 density data (R, G, B) is obtained. By using such a relationship, the correction factors a10 through a33 of the linear function represented by the above formula (1), and the correction factors a10 through a39 of the non-linear function represented by the above formula (2) are determined through the least square method.

Figure 20:
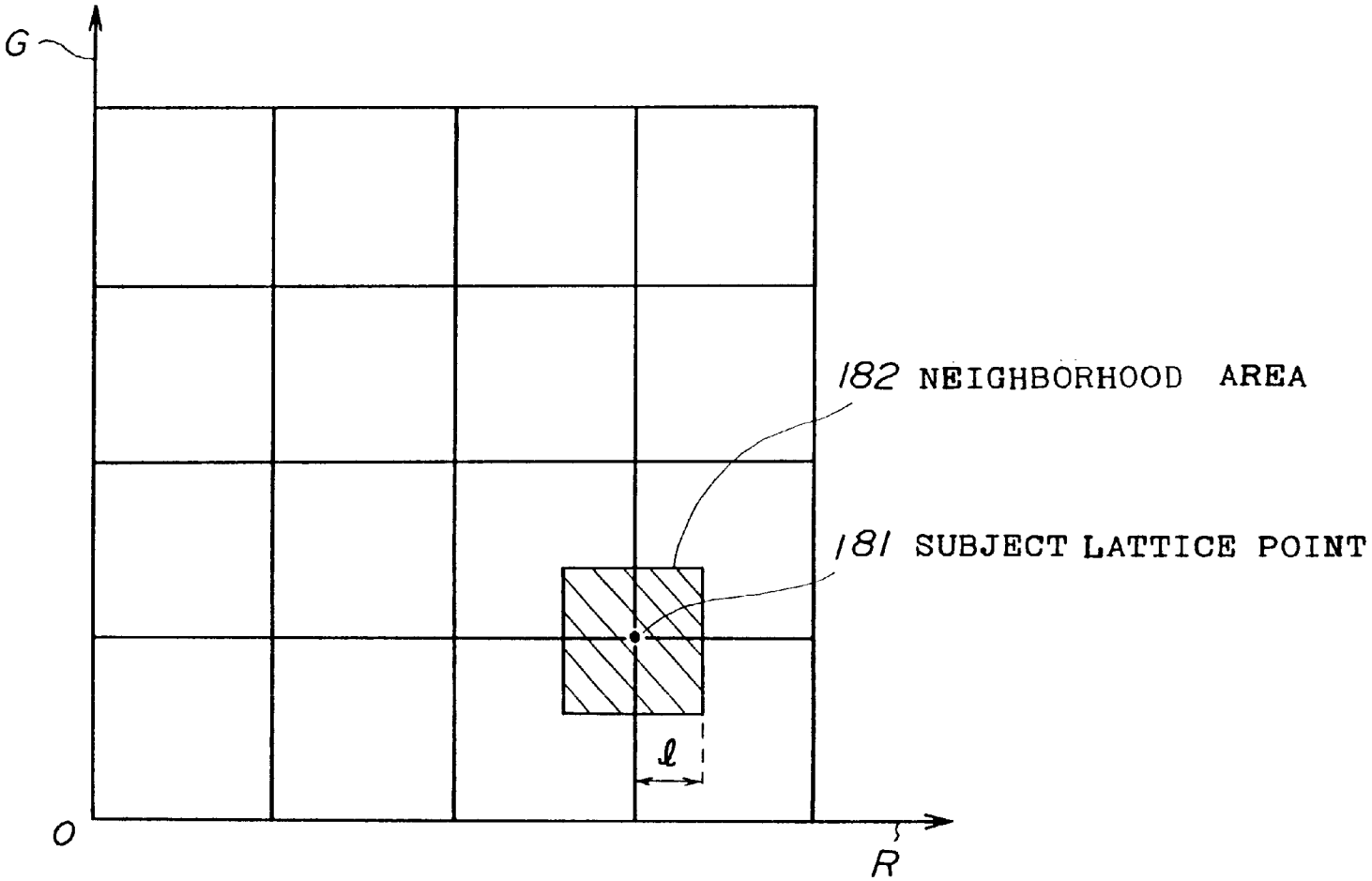
FIG. 20 is a diagram showing a neighborhood area in G-R plane which contains a subject lattice point.

The color correction circuit 164 judges whether or not the number of color pattern data which is located in a neighborhood area adjacent to a lattice point in RGB space is greater than a predetermined number. FIG.20 shows a neighborhood area in the G-R plane which contains a subject lattice point. Assuming that a lattice point 181 has coordinates (r, g, b) in RGB space, the number of color pattern data which are located in a neighborhood area 182, as indicated by shading lines in FIG.20, is determined and compared with a predetermined number. The color correction circuit 164 counts the number of color pattern data (R, G, B) satisfying the formulas: $r-1<R<r+1$, $g-1<G<g+1$, $b-1<B<b+1$, and it judges whether or not the counted number of such color pattern data is greater than a predetermined number.

In this fifth embodiment, if the number of color pattern data included in the neighborhood area containing the lattice point is not greater than the predetermined number, the Y, M and C color correction data corresponding to the lattice point is determined by using the linear function (1) including the correction factors a10 through a33. If the number of color pattern data included in the neighborhood area is greater than the predetermined number, the Y, M, C color correction data corresponding to the lattice point is determined by using the non-linear function (2) including the correction factors a10 through a39. Thus, in this fifth embodiment, it is possible to improve the quality of reproduced image whose coordinates lie in peripheral areas of RGB space.

Next, a description will be given of a sixth embodiment of the present invention. The color correction method in this embodiment is directed to improvement of the quality of reproduced images whose coordinates lie in local areas of RGB space in which a difference in color between original image and reproduced image is very appreciable. Such local areas include an achromatic color area and a highlighted area. Similar to the fifth embodiment, a relationship between the output signals (Y, M, C) and the 4913 density data (R, G, B) is obtained. By using the relationship, the correction factors a10 through a33 of the non-linear function, represented by the formula (2), are determined through the least square method. Also, among such sets of the (R, G, B) and (Y, M, C) data, only achromatic color data in which $\Delta$ (R, G, B)=max (R−G, G−B, B−R) is smaller than a predetermined level is used, and the correction factors of the non-linear function represented by the formula (2) are determined through the least square method. The correction factors thus determined are called b10 through b39.

Figure 21:
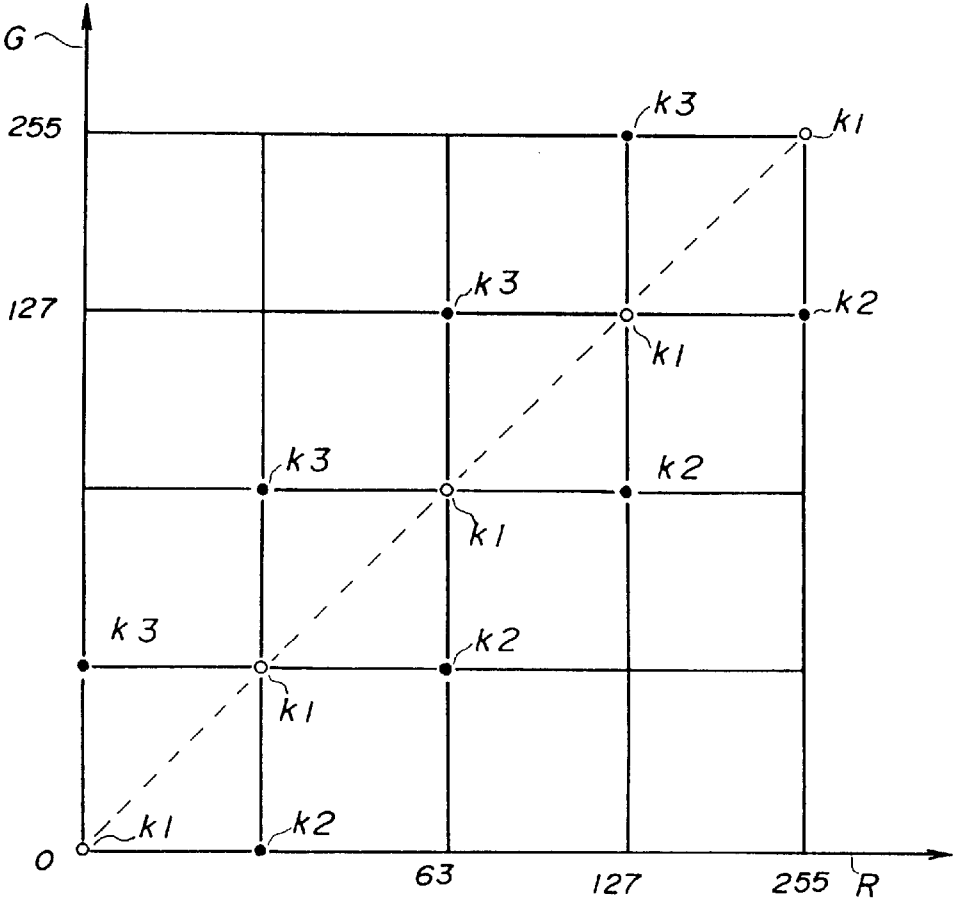
FIG. 21 is a diagram showing lattice points located in an achromatic color area in the G-R plane.

In this sixth embodiment, the Y, M, C color correction data corresponding to lattice points lying on a diagonal line (R=G=B) in RGB space is predetermined by using the non-linear function (the formula (2)) containing the correction factors b10 through b39. For the remaining lattice points other than the above lattice points, the Y, M, C color correction data is predetermined by using the non-linear function (the formula (2)) containing the correction factors a10 through a39. Thus, it is possible to improve the quality of the reproduced image whose coordinates lie adjacent to an achromatic color area of RGB space. FIG.21 shows lattice points which are included in G-R plane. In this G-R plane, k1 indicate lattice points on a diagonal line R=G, and k2 and k3 indicate lattice points adjacent to the diagonal line R=G.

Figure 22:
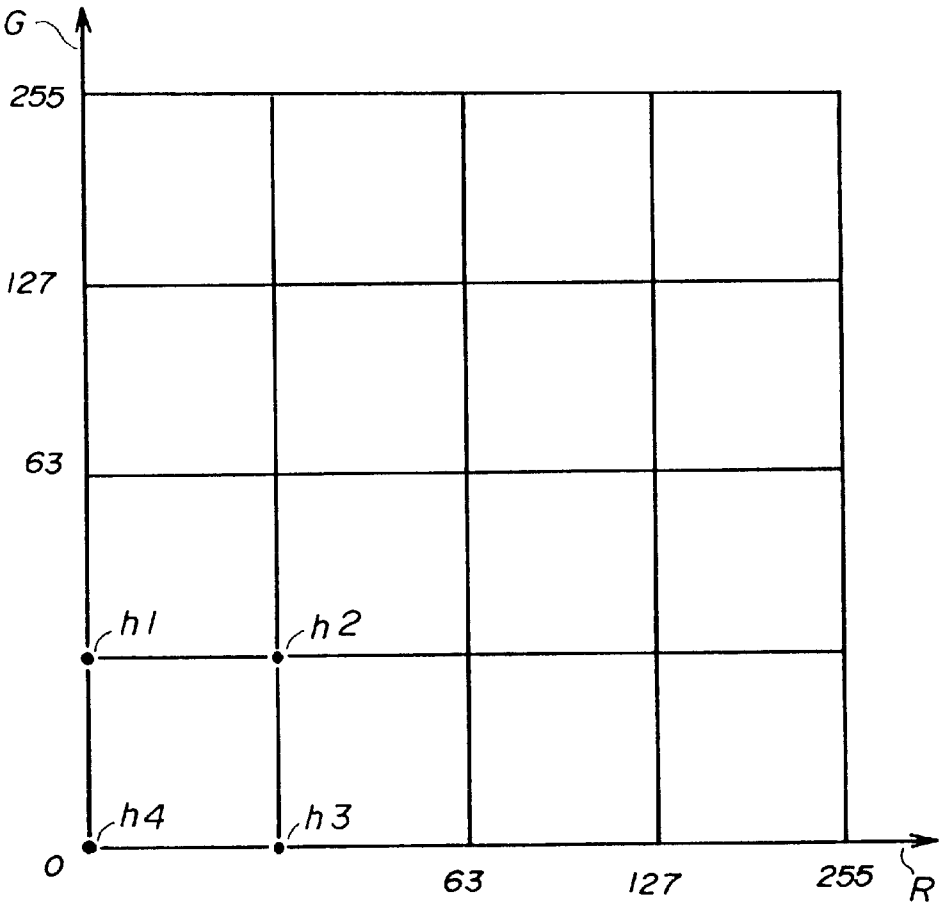
FIG. 22 is a diagram showing lattice points located in a highlighted area in the G-R plane.

In the sixth embodiment, there is another setting method which is usable for the interpolation. By using the relationship between the output signals (Y, M, C) and the 4913 density data (R, G, B), the correction factors a10 through a39 of the non-linear function, represented by the formula (2), are determined through the least square method. Also, among such set of the (R, G, B) and (Y, M, C) data, only highlighted area data in which the conditions: R<threshold Tr, G<threshold Tg, and B<threshold Tb are satisfied is used, and the correction factors of the non-linear function represented by the formula (2) are determined through the least square method. The correction factors thus determined are called c10 through c39. In the sixth embodiment, the Y, M and C color correction data corresponding to lattice points satisfying the above conditions (R<threshold Tr, G<threshold Tg, and B<threshold Tb) is predetermined by using the non-linear function (the formula (2)) containing the correction factors c10 through c39. For the remaining lattice points, other than the above lattice points, the Y, M and C color correction data is predetermined by using the non-linear function (the formula (2)) containing the correction factors a10 through a39. Thus, it is possible to improve the quality of reproduced images whose coordinates lie in highlighted areas of RGB space. FIG.22 shows lattice points in the G-R plane. In the G-R plane, h1 through h4 indicate lattice points which are included in a highlighted area in which density data R and G are lower than a predetermined threshold level (for example, R<63 and G<63). In this sixth embodiment, the present invention is applied to the 8-point interpolation, but the present invention is also applicable to the 4-point interpolation (tetrahedron method) and the 6-point interpolation (triangular prism method).

Further, the present invention is not limited to the above described embodiments, and variations and modifications may be made without departing from the scope of the present invention.

What is claimed is:

1. An interpolation method for converting three-dimensional color separated input signals into three-dimensional color correction signals for use in an image data processing apparatus, comprising the steps of:

inputting three-dimensional color separated input signals produced within said image data processing apparatus from an original image to be reproduced;

selecting a triangular prism, based on x, y and z coordinates of said input signals, from a plurality of unit triangular prisms into which XYZ color space is divided;

reading out lattice point data of the selected triangular prism from a memory in which predetermined correction data is stored, which data corresponds to six lattice points of each of said plurality of unit triangular prisms;

calculating correction data, corresponding to the input signals, through interpolation of values of said six lattice point data read out from said memory; and generating said correction signals based on said calculated correction data.

2. The interpolation method as claimed in claim 1, wherein each of the lattice points of the plural unit triangular prisms lie on a square lattice or triangular lattice in XYZ space.

3. The interpolation method as claimed in claim 1, wherein said input signals are color signals and yellow, magenta and cyan ink quantity signals are generated from red, green and blue input signals supplied by an input sensor when a color document is scanned.

4. The interpolation method as claimed in claim 3, wherein said lattice point data of the selected triangular prism stored in said memory is loaded into a second memory when color correction is performed, said correction data being calculated through interpolation with reference to said lattice point data loaded in the second memory.

5. The interpolation method as claimed in claim 1, wherein said calculation is performed by using a linear function including variables of correction data corresponding to lattice points in XYZ space, and linear function including correction factors whose values are determined through a least square method by using predetermined input data and output data.

6. A color correction method for generating three-dimensional color correction signals Y, M and C from three-dimensional color separated input signals R, G and B through interpolation for use in an image data processing apparatus, comprising the steps of:

inputting three-dimensional color separated input signals produced within said image data processing apparatus from an original image to be reproduced;

calculating a set of correction factors by applying a least square method based on a plurality of color pattern data which is printed with predetermined ink quantities, and based on density data obtained by color decomposition of said plurality of color pattern data;

determining correction signals Y, M and C, corresponding to six lattice points in RGB space, by using said calculated set of correction factors;

setting said correction signals Y, M and C, to a lattice point in RGB space when said lattice point is located in an area of RGB space in which the density data is lower than a predetermined level; and setting said correction signals Y, M and C, to a lattice point in RGB space when said lattice point is not located in an area of RGB space in which the density data is lower than a predetermined level.

7. A color correction method for generating three-dimensional color correction signals Y, M and C from three-dimensional color separated input signals R, G and B through interpolation for use in an image data processing apparatus, comprising the steps of:

inputting three-dimensional color separated input signals produced within said image data processing apparatus from an original image to be reproduced;

calculating a set of correction factors by applying a least square method based on a plurality of color pattern data which is printed with predetermined ink quantities, and based on density data obtained by color decomposition of said plurality of color pattern data, said density data corresponding to a local area of RGB space in which a color difference between the original image and the reproduced image is appreciable;

determining correction signals Y, M and C, corresponding to six lattice points which are located in said local area of RGB space, by using said calculated set of correction factors; and setting said correction signals Y, M and C, to said six lattice points located in said local area of RGB space.

8. The color correction method as claimed in claim 7, wherein said local area of RGB space is an achromatic color area in which a color difference represented by max (R−G, G−B, B−R) is lower than a predetermined level.

9. The color correction method as claimed in claim 7, wherein said local area of RGB space is highlighted area in which red, green and blue signals whose densities are lower than a predetermined threshold level.

10. An apparatus for converting three-dimensional color separated input signals into three-dimensional color correction signals, comprising:

a converting means for converting information obtained by [said] *an* image scanner into said input signals;

a memory means for storing a plurality of triangular prisms into which XYZ space is divided;

a selection means for selecting a triangular prism, based on x, y and z coordinates of said input signals from said plurality of triangular prisms stored in said memory means;

first interpolation means for generating first interpolated values within said triangular prism selected by said selection means;

second interpolation means for generating second interpolated values within a triangular section of said triangular prism selected by said selection means; and calculating means for calculating said correction signals in accordance with said first and second interpolated values.

*11. An interpolation method for converting three-dimensional color separated input signals into signals of another color space for use in an image data processing apparatus, comprising the steps of:*

*inputting from an original image to be reproduced three-dimensional color separated input signals produced within said image data processing apparatus;*

*selecting a triangular prism, based on x, v and z coordinates of said input signals, from a plurality of unit triangular prisms into which the another color space is divided;*

*reading out lattice point data of the selected triangular prism from a memory in which predetermined correction data are stored, which data correspond to six lattice points of each of said plurality of unit triangular prisms;*

*calculating correction data, corresponding to the input signals, through interpolation of values of said six lattice point data read out from said memory; and*

*generating said signals of another color space based on said calculated correction data.*

*12. The interpolation method as claimed in claim 11, wherein each of the lattice points of the plural unit triangular prisms lies on a square lattice or triangular lattice in the another color space.*

*13. The interpolation method as claimed in claim 11, wherein said input signals are color signals and yellow, magenta and cyan ink quantity signals are generated from red, green and blue input signals supplied by an input sensor when a color document is scanned.*

*14. The interpolation method as claimed in claim 13, wherein said lattice point data of the selected triangular prism stored in said memory is loaded into a second memory when color correction is performed, said correction data being calculated through interpolation with reference to said lattice point data loaded in the second memory.*

*15. The interpolation method as claimed in claim 11, wherein said calculation is performed by using a linear function including variables of correction data corresponding to lattice points in the another color space, said linear function including correction factors whose values are determined through a least square method by using predetermined input data and output data.*

*16. The interpolation method of claim 11, further comprising the step of storing the generated signals of another color space.*

*17. A color correction method for generating signals of a target color space from three-dimensional color separated input signals through interpolation for use in an image data processing apparatus, comprising the steps of:*

*inputting from an original image to be reproduced three-dimensional color separated input signals produced within said image data processing apparatus;*

*calculating a set of correction factors by applying a least square method based on a plurality of color pattern data which is printed with predetermined color quantities, and based on density data obtained by color decomposition of said plurality of color pattern data;*

*determining the signals of the target color space, corresponding to six lattice points in the target color space, by using said calculated set of correction factors;*

*setting said signals of the target color space to a lattice point in the target color space when said lattice point is located in an area of the target color space in which the density data is lower than a predetermined level; and*

*setting said signals of the target color space to a lattice point in the target color space when said lattice point is not located in an area of the target color space in which the density data is lower than a predetermined level.*

*18. A color correction method for generating signals of a target color space from three-dimensional color separated input signals through interpolation for use in an image data processing apparatus, comprising the steps of:*

*inputting three-dimensional color separated input signals produced within said image data processing apparatus;*

*calculating a set of correction factors by applying a least square method based on a plurality of color pattern data which is printed with predetermined color quantities, and based on density data obtained by color decomposition of said plurality of color pattern data, said density data corresponding to a local area of the target color space in which a color difference between an original image and a reproduced image is appreciable;*

*determining the signals of the target color space corresponding to six lattice points which are located in said local area of the target color space, by using said calculated set of correction factors; and*

*setting said signals of the target color space to said six lattice points located in said local area of the target color space.*

*19. The color correction method as claimed in claim 18, wherein said local area of the target color space is an achromatic color area in which a color difference between the original image and the reproduced image is lower than a predetermined level.*

*20. The color correction method as claimed in claim 18, wherein said local area of the target color space is a highlighted area in which three-dimensional signals have values lower than a predetermined threshold level.*

*21. An apparatus for converting three-dimensional color separated input signals into signals of another color space, comprising:*

*a converting means for converting information obtained by an image scanner into said input signals;*

*a memory means for storing a plurality of triangular prisms into which the another color space is divided;*

*a selection means for selecting a triangular prism, based on x, v and z coordinates of said input signals from said plurality of triangular prisms stored in said memory means;*

*first interpolation means for generating first interpolated values within said triangular prism selected by said selection means;*

*second interpolation means for generating second interpolated values within a triangular section of said triangular prism selected by said selection means; and*

*an output for outputting said signals of the another color space in accordance with said first and second interpolated values.*

22. An apparatus configured to convert three-dimensional color separated input signals into signals of another color space, comprising:

a converter configured to convert an analog input signal to a corresponding digital input signal;

a memory part configured to store a plurality of triangular prisms into which the another color space is divided;

a selection part configured to select a triangular prism that corresponds with a three-dimensional coordinate of the another color space provided by the digital input signal;

a first interpolation part configured to calculate a first interpolated value within said triangular prism selected by said selection part;

a second interpolation part configured to calculate a second interpolated value within a triangular section of said triangular prism selected by said selection device; and an output configured to output said signals of the another color space in accordance with the first and second interpolated values.

23. The apparatus of claim 22, further comprising a sensor configured to generate the analog input signal, said sensor comprising at least one of a photoelectric element and a CCD.

24. The apparatus of claim 22, wherein said first interpolation part comprises:

a first input configured to receive a first value, $P1$, output from said selection device, said first value being a predetermined value with respect to at least one of six vertex points of a ridge of a selected triangular prism;

a second input configured to receive a second value, $P2$, output from said selection device, said second value being a predetermined value with respect to at least one of six vertex points of a ridge of the selected triangular prism;

a third input configured to receive a lower bit value, $dz$, of the digital input signal; and means for calculating an interpolated output value, $Pa$, from said first value, said second value, and said lower bit value according to the relationship $Pa=P2+dz(P2-P1)$.

25. The apparatus of claim 24, wherein said means for calculating comprises an adder, a subtractor and a multiplier.

26. The apparatus of claim 22, wherein, said selection part comprises, a first output configured to output a first gradient factor, $ai$, corresponding to a difference between a first and a second value, each of the values being predetermined with respect to two vertex points of one ridge of the selected unit triangular prism, a second output configured to output an intercept factor, $bi$, that corresponds with the second value, and a third output configured to output a lower bit value, $dz$, of the three dimensional coordinate provided by the digital input signal; and said first interpolation part comprises, an input configured to receive said gradient value, said intercept value and said lower bit value, and means for calculating an interpolated output value, $Pa$, from said gradient value, said intercept value, and said lower bit value according to the relationship $Pa=ai\cdot dz+bi$.

27. The apparatus of claim 26, wherein said means for calculating comprises:

a multiplier configured to calculate a produce $ai\cdot dz$, and an adder configured to add $bi$ to the product $ai\cdot dz$.

28. The apparatus of claim 22, wherein said second interpolating part comprises:

an input configured to receive from said first interpolating part a first input, $Pa$, representing a first interpolated value, a second input, $Pb$, representing a second interpolated value, and a third input, $Pc$, representing a third interpolated value;

a first subtractor configured to calculate a first difference value $(Pb-Pa)$;

a second subtractor configured to calculate a second difference value $(Pc-Pb)$;

a first multiplier configured to multiply a first lower bit value, $dx$, by a first multiplier input;

a second multiplier configured to multiply a second lower bit value, $dy$, by a second multiplier input;

a multiplexer controlled by the first lower bit value, $dx$ and the second lower bit value, $dy$, said multiplexer configured to provide the first difference value $(Pb-Pa)$ to the first multiplier input and configured to provide the second difference value $(Pc-Pb)$ to the second multiplier input when $dx>dy$, and configured to provide the second difference value $(Pc-Pb)$ to the first multiplier input and configured to provide the first difference $(Pb-Pa)$ value to the second multiplier input when $dx<dy$, such that the first multiplier outputs a second product value $(Pc-Pb)dx$ and the second multiplier outputs $(Pc-Pb)dy$ when $dx>dy$, and the first multiplier outputs a third product value $(Pc-Pa)dx$ and the second multiplier outputs a fourth product value $(Pb-Pa)dy$ when $dx<dy$; and an adder configured to add the first, second, third and fourth product values and the first input $Pa$ are input to the adder and outputting a sum value $P$, where $P=(Pb-Pa)dx+(Pc-Pb)dy+Pa$ when $dx>dy$, and $P=(Pc-Pb)dx+(Pb-Pa)dy+Pa$ when $dx<dy$.

29. The apparatus of claim 22, wherein at least one adder, a multiplier and a subtractor are implemented in a CPU.

30. The apparatus of claim 22, wherein said output includes at least one of an adder, a multiplier and a subtractor.

31. An apparatus configured to generate signals of a target color space from three-dimensional color separated input signals through interpolation for use in an image data processing apparatus, comprising:

an interpolation part including, a random access memory, a first signal part, a second signal part, and a third signal part;

a memory device, connected to said interpolation part, configured to store predetermined output data corresponding to a lattice point in a triangular prism; and a CPU, connected to said interpolation part and said memory device, configured to control a computer color correction computer implemented process comprising the steps of, inputting to the first, the second, and the third signal parts respective three-dimensional color separated input signals produced within an image data processing apparatus from an original image to be reproduced,

*selecting a triangular prism, based on three dimensional coordinates of said input signals, from a plurality of unit triangular prisms into which the target color space is divided,*

*reading out lattice point data for the selected triangular prism from the memory device, which data corresponds to six lattice points of each of said plurality of unit triangular prisms,*

*calculating correction data, corresponding to the input signals, through interpolation of values of said six lattice point data read out from said memory, and*

*generating the signals of a target color space based on said calculated correction data.*

*32. The color correction apparatus of claim 31, further comprising a picture processing part that performs color correction of the lattice point stored in the memory.*

*33. A color correction method for generating signals of a target color space from three-dimensional color separated input signals through interpolation for use in an image data processing apparatus, comprising the steps of:*

*inputting from an original image to be reproduced three-dimensional color separated input signals produced within said image data processing apparatus selecting a triangular prism based on x, v and z coordinates of said input signals, from a plurality of unit triangular prisms into which the target color space is divided;*

*reading out correction factors for the selected triangular prism from a memory in which predetermined correction factors are stored; and*

*determining the signals of the target color space, corresponding to the three-dimensional color separated input signals, through interpolation by using said correction factors provided for the selected triangular prism.*

*34. A color correction method for generating signals of a target color space from three-dimensional color separated input signals through interpolation for use in an image data processing apparatus, comprising the steps of:*

*inputting from an original image to be reproduced three-dimensional color separated input signals produced within said image data processing apparatus;*

*selecting a triangular prism, based on x, v and z coordinates of said input signals, from a plurality of unit triangular prisms into which the target color space is divided; and*

*determining the signals of the target color space, corresponding to the three-dimensional color separated input signals, through at least one of the steps of,*

*interpolating by using correction factors for the selected triangular prism, said correction factors read from a memory in which predetermined correction factors are stored, and*

*generating said signals of the target color space based on a set of calculated correction data, said generating step comprising,*

*reading out lattice point data from the selected triangular prism from a memory in which predetermined correction data are stored, which data corresponds to six lattice points of each of said plurality of unit triangular prisms, and*

*calculating said set of calculated correction data, corresponding to the input signals, through interpolation of values of said six lattice point data read out from said memory.*

* * * * *